(12) United States Patent
Sinha

(10) Patent No.: US 7,783,300 B2
(45) Date of Patent: Aug. 24, 2010

(54) SYSTEMS AND METHODS FOR PROACTIVELY ENFORCING A WIRELESS FREE ZONE

(75) Inventor: Amit Sinha, Marlborough, MA (US)

(73) Assignee: AirDefense, Inc., Alpharetta, GA (US)

( * ) Notice: Subject to any disclaimer, the term of this patent is extended or adjusted under 35 U.S.C. 154(b) by 911 days.

(21) Appl. No.: 11/603,814

(22) Filed: Nov. 22, 2006

(65) Prior Publication Data

US 2008/0119130 A1    May 22, 2008

(51) Int. Cl.
*H04Q 7/20* (2006.01)
(52) U.S. Cl. .................... 455/456.1; 455/450; 455/455
(58) Field of Classification Search ............... 455/1, 455/450, 455, 456.1, 456.4; 370/328
See application file for complete search history.

(56) References Cited

U.S. PATENT DOCUMENTS 5,787,350 A * 7/1998 van der Vorm et al. ...... 455/446
2006/0038677 A1* 2/2006 Diener et al. ............... 340/540
2006/0165073 A1 7/2006 Gopinath et al.
2006/0165078 A1 7/2006 Gopinath et al.
2008/0144493 A1* 6/2008 Yeh ............................. 370/230

* cited by examiner

*Primary Examiner*—Nhan Le
(74) *Attorney, Agent, or Firm*—Clements Bernard PLLC; Lawrence A. Baratta, Jr.; Christopher L. Bernard

(57) ABSTRACT

The present disclosure is directed to systems and methods for proactively enforcing a wireless free zone over an enterprise's airspace using Open Systems Interconnect (OSI) layer one, two, and three based techniques. The systems and methods prevent wireless communications over IEEE 802.11 (WiFi), IEEE 802.16 (WiMax), and IEEE 802.15.1 (Bluetooth) networks to enable an enterprise to enforce compliance to a no-wireless policy. Smart antennas and coverage planning are included to avoid disrupting a neighbor's wireless communications. Further, the disclosed systems and methods can be combined into existing Wireless Intrusion Prevention Systems (WIPS) or in a stand-alone sensor and server configuration to offer proactive no-wireless zones.

29 Claims, 16 Drawing Sheets

SYSTEMS AND METHODS FOR PROACTIVELY ENFORCING A WIRELESS FREE ZONE

CROSS-REFERENCE TO RELATED APPLICATION(S)

This application incorporates by this reference in their entirety for all purposes commonly assigned U.S. patent applications filed Jun. 3, 2002:

| Application No. | Title |
| --- | --- |
| 10/161,142 | "SYSTEMS AND METHODS FOR NETWORK SECURITY" |
| 10/161,440 | "SYSTEM AND METHOD FOR WIRELESS LAN DYNAMIC CHANNEL CHANGE WITH HONEYPOT TRAP" |
| 10/161,443 | "METHOD AND SYSTEM FOR ACTIVELY DEFENDING A WIRELESS LAN AGAINST ATTACKS" |
| 10/160,904 | "METHODS AND SYSTEMS FOR IDENTIFYING NODES AND MAPPING THEIR LOCATIONS" |
| 10/161,137 | "METHOD AND SYSTEM FOR ENCRYPTED NETWORK MANAGEMENT AND INTRUSION DETECTION" |

Furthermore, this application incorporates by reference for all purposes, commonly assigned U.S. patent applications filed Nov. 4, 2003:

| Application No. | Title |
| --- | --- |
| 10/700,842 | "SYSTEMS AND METHODS FOR AUTOMATED NETWORK POLICY EXCEPTION DETECTION AND CORRECTION" |
| 10/700,914 | "SYSTEMS AND METHOD FOR DETERMINING WIRELESS NETWORK TOPOLOGY" |
| 10/700,844 | "SYSTEMS AND METHODS FOR ADAPTIVELY SCANNING FOR WIRELESS COMMUNICATIONS" |

Furthermore, this application incorporates by reference for all purposes, commonly assigned U.S. patent applications filed Feb. 6, 2004:

| Application No. | Title |
| --- | --- |
| 10/774,034 | "SYSTEMS AND METHODS FOR ADAPTIVE LOCATION TRACKING" |
| 10/774,111 | "WIRELESS NETWORK SURVEY SYSTEMS AND METHODS" |
| 10/774,896 | "SYSTEMS AND METHODS FOR ADAPTIVE MONITORING WITH BANDWIDTH CONSTRAINTS" |
| 10/774,915 | "DYNAMIC SENSOR DISCOVERY AND SELECTION SYSTEMS AND METHODS" |

Furthermore, this application incorporates by reference for all purposes, commonly assigned U.S. patent applications filed Oct. 19, 2005:

| Application No. | Title |
| --- | --- |
| 11/253,316 | "PERSONAL WIRELESS MONITORING AGENT" |

Furthermore, this application incorporates by reference for all purposes, commonly assigned U.S. patent applications filed Jan. 13, 2006:

| Application No. | Title |
| --- | --- |
| 11/332,065 | "SYSTEMS AND METHODS FOR WIRELESS INTRUSION DETECTION USING SPECTRAL ANALYSIS" |

Furthermore, this application incorporates by reference for all purposes, commonly assigned U.S. patent applications filed Mar. 17, 2006:

| Application No. | Title |
| --- | --- |
| 11/276,925 | "SYSTEMS AND METHODS FOR WIRELESS SECURITY USING DISTRIBUTED COLLABORATION OF WIRELESS CLIENTS" |
| 11/276,930 | "SYSTEMS AND METHODS FOR WIRELESS NETWORK FORENSICS" |

This application also incorporates by reference for all purposes, commonly assigned U.S. patent application filed May 10, 2006:

| Application No. | Title |
| --- | --- |
| 11/382,590 | "RFID INTRUSION PROTECTION SYSTEM AND METHODS" |

This application also incorporates by reference for all purposes, commonly assigned U.S. patent application filed Jun. 16, 2006:

| Application No. | Title |
| --- | --- |
| 11/424,628 | "SYSTEMS AND METHODS FOR WIRELESS CONTENT FILTERING" |

This application also incorporates by reference for all purposes, commonly assigned U.S. patent application filed Aug. 11, 2006:

| Application No. | Title |
| --- | --- |
| 11/464,043 | "METHODS AND SYSTEMS FOR WIRED EQUIVALENT PRIVACY AND WI-FI PROTECTED ACCESS PROTECTION" |

-continued

| Application No. | Title |
|---|---|
| | |

FIELD OF THE INVENTION

This disclosure relates to wireless network security systems and methods, and more particularly to systems and methods proactively enforcement a wireless free zone over an enterprise's airspace preventing wireless protocols such as IEEE 802.11 (WiFi), IEEE 802.16 (WiMax), and IEEE 802.15.1 (Bluetooth) utilizing Open Systems Interconnect (OSI) layer one, two, and three based techniques coupled with smart antennas and coverage planning to avoid disrupting a neighbor's wireless communications.

BACKGROUND OF THE INVENTION

Wireless communications, such as IEEE 802.11 (WiFi), IEEE 802.16 (WiMax), and IEEE 802.15.1 (Bluetooth), have proliferated due to the availability of wireless spectrum and wireless communications components. Traditional wired networks use cables to transfer information. Cables are a controlled medium, protected by the buildings that enclose them. External traffic that enters a wired network is policed by a firewall and established wired intrusion-protection technologies. To gain access to a wired network, an intruder or hacker must bypass the physical security of the building or breach the firewall.

Wireless networks, on the other hand, use the airspace to transfer information. The airspace is an uncontrolled and shared medium—it lacks the equivalent physical control of its wired counterpart. Once a user connects a wireless access point (AP) into the network, its signals can travel through the walls, ceilings, and windows of the building, exposing the traditionally secure physical and link layers. This renders the entire network accessible from another floor of the building, from an adjoining building, from the parking lot, or from across the street. Radio signals from a single wireless AP can travel up to thousands of feet outside of the building. Additionally, wireless devices share the airspace. Any wireless device in the network can sniff all the traffic of all other wireless devices within the same the basic service set.

As wireless networks proliferate and costs decrease for wireless components, networks are becoming more insecure due to the inherent security weaknesses of wireless networks. Enterprises have deployed wireless intrusion prevention systems (WIPS) to proactively monitor and prevent attacks on the wireless networks. Some enterprises have begun to adopt "no wireless" policies forbidding the use of wireless networks on-site. Without a means to enforce such policies, network operators cannot determine compliance to the policy.

Further, regulatory compliance (e.g., HIPAA, GLBA, PCI, DoD Directive) requires network security audits and reports to demonstrate effective internal control over protection of confidential data. For example, the Department of Defense (DoD) issued a new DoD policy on Jun. 2, 2006 as a supplement to DoD Directive 8100.2 which requires wireless intrusion detection systems (WIDS) for all DoD wired and wireless LANs. WIDS and WIPS both describe systems capable of continuous monitoring (i.e. 24×7) and detection of authorized and unauthorized devices on wireless networks. WIPS systems also include prevention mechanisms to proactively prevent unauthorized devices from accessing wireless networks. Also, the DoD policy requires location sensing capabilities With regards to this directive, a wired DoD network without wireless capability would benefit from proactively locking down wireless access rather than simply detect unauthorized devices.

Systems and methods are needed to effectively and proactively lock down wireless communications such as IEEE 802.11 (WiFi), IEEE 802.16 (WiMax), and 802.15.1 (Bluetooth) while not affecting neighboring areas.

BRIEF SUMMARY OF THE INVENTION

The present disclosure is directed to systems and methods for proactively enforcing a wireless free zone over an enterprise's airspace using Open Systems Interconnect (OSI) layer one, two, and three based techniques. The systems and methods prevent wireless communications over IEEE 802.11 (WiFi), IEEE 802.16 (WiMax), and IEEE 802.15.1 (Bluetooth) networks to enable an enterprise to proactively enforce compliance to a no-wireless policy. Smart antennas and coverage planning are included to avoid disrupting a neighbor's wireless communications. Further, the disclosed systems and methods can be combined into existing Wireless Intrusion Prevention Systems (WIPS) or in a stand-alone sensor and server configuration to offer proactive no-wireless policies.

In an exemplary embodiment of the present disclosure, a method for proactively enforcing a wireless free zone over a pre-defined area includes performing radio frequency (RF) simulation of the pre-defined area, the RF simulation is configured to provide placement location of sensors to provide a coverage area in the pre-defined area and to minimize signal bleed into areas neighboring the pre-defined area; placing sensors in the pre-defined area responsive to the RF simulation; and enforcing the wireless free zone throughout the coverage area with the sensors.

In various exemplary embodiments, the enforcement of a wireless free zone for IEEE 802.11 protocols can be done through OSI layer 1, 2, and 3 techniques. Clear-to-send (CTS) frames can be transmitted with long duration fields to reserve a wireless channel thereby prevent other devices from communicating on the wireless channel. Further, CTS frames with long duration fields can be sent on across multiple wireless channels utilizing a predetermined set of channels in the 2.4 GHz and 5 GHz bands. Data frames can be transmitted with long duration fields over a wireless channel to cause other devices that may want to communicate to continuously set their network allocation vector to prevent the other devices from getting a clear channel assessment. Also, Data frames with long duration fields simulated to look like legitimate traffic can be sent across multiple channels utilizing a predetermined set of channels in the 2.4 GHz and 5 GHz bands. Data and CTS frames with long duration fields can be used in combination with an intelligent scanning pattern across multiple wireless channels. Other enforcing mechanisms can include injecting burst noise during unauthorized frame transmission, blocking all wireless communications with noise and interference, and higher layer blocking of Internet Protocol based communication using the sensors to inject frame spoofed ARP frames or SYN/RST frames for a TCP denial-of-service.

In various exemplary embodiments, the enforcement of a wireless free zone for Bluetooth can be done by transmitting an l2ping flood and by transmitting a 40 MHz wide continuous transmission over IEEE 802.11 channel 6 (2437 MHz) to create broadband interference in the 2.4 GHz band to prevent Bluetooth devices from communicating.

In various exemplary embodiments, the enforcement of a wireless free zone for WiMax can be done by monitoring WiMax stations for UL-MAP frames; transmitting an in-band jamming signal during a station's slot based upon the monitoring of UL-MAP frames to effectively deny the station WiMax service; and repeating the monitoring and transmitting steps. In another exemplary embodiment, he enforcement of a wireless free zone for WiMax can be done by monitoring WiMax stations for a handshake; transmitting Auth Reject frames that are not authenticated with the HMAC digest to prevent a station from successfully authenticating and repeating the monitoring and transmitting steps.

In another exemplary embodiment of the present disclosure, a system for proactively enforcing a wireless free zone includes one or more sensors connected to a network, the sensors comprise one or more wireless radios configured to monitor a wireless network and to transmit frames on the wireless network; and a server connected to the one or more sensors through the network, the server configured to log events; generate alarms, notifications, and reports; and direct the one or more sensors to prevent wireless communications to enforce the wireless free zone; wherein the one or more sensors are deployed in an area responsive to radio frequency (RF) simulations which predict the placement of the sensors to guarantee coverage over the area and to minimize signal bleed into neighboring areas. The one or more sensors transmit a mixture of data and clear-to-send frames with long duration fields while scanning through multiple wireless channels to prevent any other devices from ever communicating on the wireless channels to enforce the wireless free zone. Also, the one or more sensors in the area synchronize through the server and utilized intelligent scanning patterns to maximize temporal and spatial coverage of the multiple wireless channels in the area. Optionally, the sensors are further configured to measure the signal strength of the transmissions of other sensors in the area and report the measured signal strengths to the server; and the server is further configured to determine signal coverage over the area based on the signal strengths and adjust the transmit power level on the one or more sensors responsive to a determination that the signal coverage exceeds the area.

BRIEF DESCRIPTION OF THE DRAWINGS

Systems and methods of the present disclosure are illustrated and described herein with reference to the various drawings, in which like reference numbers denote like method steps and/or system components, respectively, and in which.

DETAILED DESCRIPTION OF THE INVENTION

The present disclosure is directed to systems and methods for proactively enforcing a wireless free zone over an enterprise's airspace using Open Systems Interconnect (OSI) layer one, two, and three based techniques. The systems and methods prevent wireless communications over IEEE 802.11 (WiFi), IEEE 802.16 (WiMax), and IEEE 802.15.1 (Bluetooth) networks to enable an enterprise to proactively enforce compliance to a no-wireless policy. Smart antennas and coverage planning are included to avoid disrupting a neighbor's wireless communications. Further, the disclosed systems and methods can be combined into existing Wireless Intrusion Prevention Systems (WIPS) or in a stand-alone sensor and server configuration to offer proactive no-wireless policies.

Figure 1:
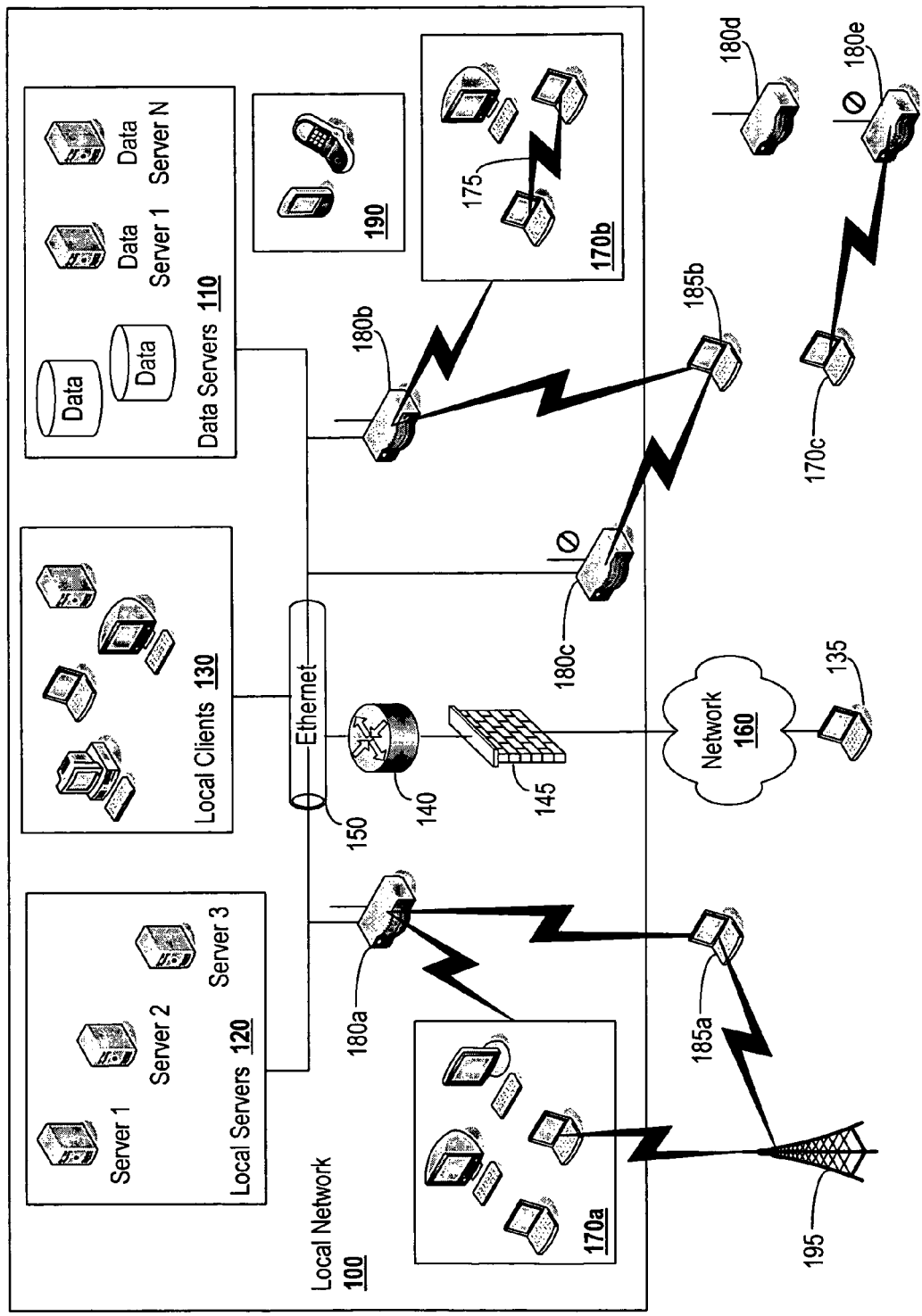
FIG. 1 illustrates an exemplary embodiment of a local network including both wired and wireless components.

FIG. 1 illustrates an exemplary embodiment of a local network 100 including both wired and wireless components. The wired components depicted in FIG. 1 include a variety of connected systems such as local servers 120, local clients 130 and network accessible data storage servers 110. The local servers 120, local clients 130, and data servers 110 are connected through an Ethernet 150 connection. A router 140 connects the Ethernet 150 and the components 110, 120, 130 to an external network 160 such as the Internet. A firewall 145 can be included to protect the wired local network and act as a security gate to prevent unauthorized traffic coming from the network 160 such as a potential hacker 135. A firewall 145 can effectively deter an attack from a wired hacker 135 via the network 160.

By installing wireless access points (AP) 180a, 180b to the wired network (e.g., Ethernet 150 and router 140), personal computers and laptops equipped with wireless local area network (WLAN) cards create a wireless network 170a, 170b which can connect to the wired network at broadband speeds (i.e., 11 Mb/s to 54 Mb/s) using IEEE 802.11a/b/g protocols for example.

Wireless networks 170a, 170b operate over the airspace which is an uncontrolled and shared medium lacking the equivalent physical control of its wired counterpart. As such, wireless hackers 185a, 185b can enter the local network 100 through the access points 180a, 180b even if the access points 180a, 180b are located behind the firewall 145. Therefore, wireless networks 170a, 170b (in conjunction with access points 180a, 180b) can provide opportunities for unauthorized users to attack a network, which can include in various examples: a local area network, a wide area network, a metropolitan area network, a corporate intranet, among many others.

A wireless AP 180c can be installed unbeknownst to the enterprise (e.g., rogue AP) or it can be installed and misconfigured (e.g. misconfigured AP). As such, the AP 180c can also provide opportunities for unauthorized users to access the network. Due to the low cost of APs 180c, anyone with access to an enterprise can install a rogue AP 180c and connect it to the Ethernet 150 network providing complete wireless access to the enterprise. A misconfigured AP 180c can have the wrong encryption settings allowing any user to gain access to the enterprise.

Also, municipal wireless networks 195 are proliferating with local governments providing free IEEE 802.11 access. These networks 195 can be used by a wireless hacker 185a to gain access to a device on the enterprise's wireless network 170a which is set to allow inbound connections effectively bypassing the enterprise firewall and content filtering. Additionally, mobile users 170c face threats from evil twin APs 180e which gain access to the user's 170c login credentials by posing as a legitimate AP 180d. Such a threat can allow the evil twin AP 180e to relay the credentials to a hacker for access to the enterprise's wireless network 170a,170b.

In addition to IEEE 802.11 access, other wireless protocols 190 such as Bluetooth and WiMax are proliferating. Bluetooth is deployed within the enterprise with PDA, cellular phones, and the like. WiMax is a wireless standard for the delivery of last mile wireless broadband access as an alternative to cable and DSL.

Figure 2:
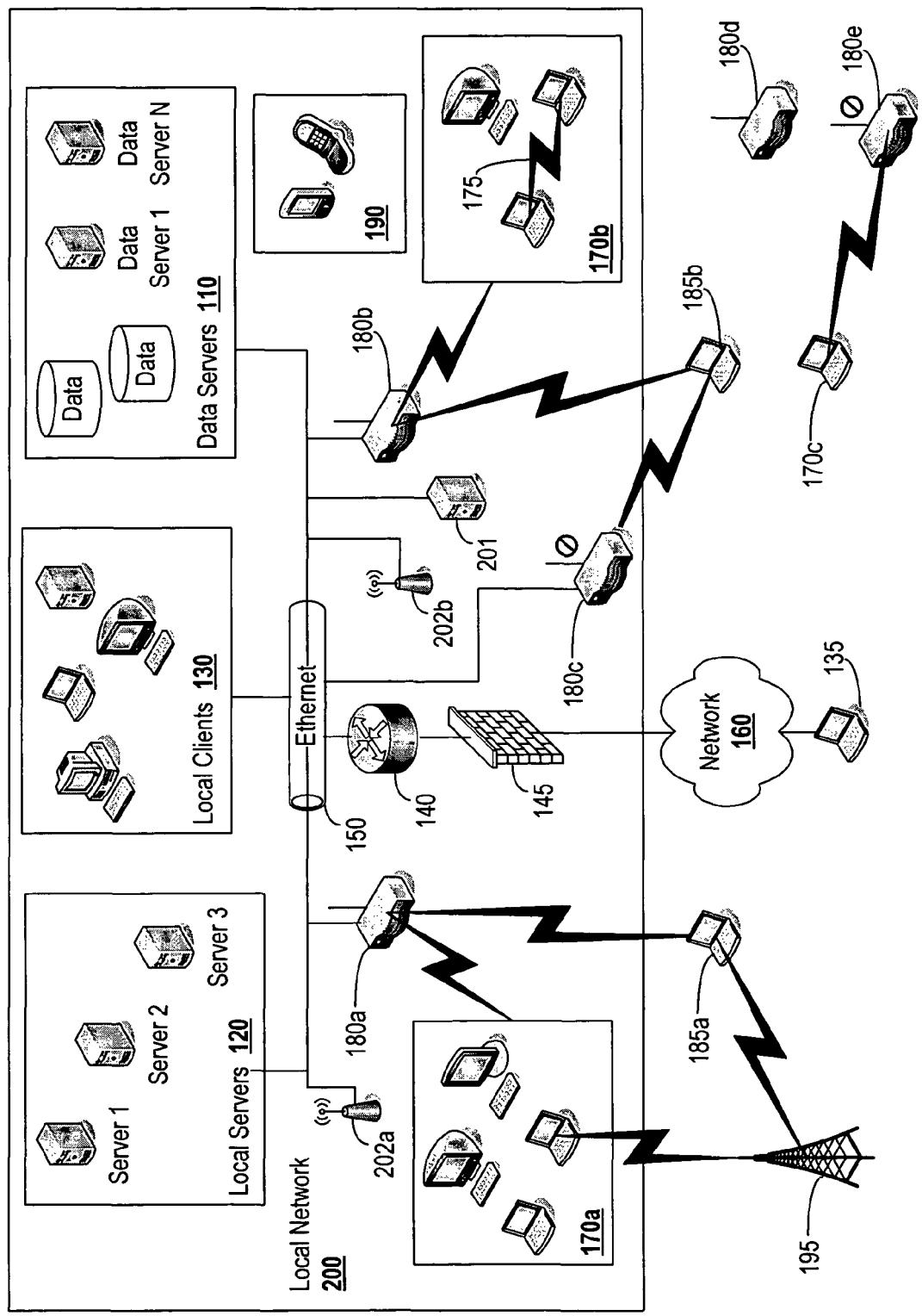
FIG. 2 illustrates an exemplary embodiment of a local network configured with wireless sensors and a server for monitoring and preventing wireless intrusions on the wireless networks.

FIG. 2 illustrates an exemplary embodiment of a local network 200 configured with wireless sensors 202a, 202b and a server 201 for monitoring and preventing wireless intrusions on the wireless networks 170a, 170b. The sensors 202a, 202b connect to the Ethernet 150 network, and each sensor 202a, 202b is located to monitor and prevent intrusions over a pre-defined area for wireless activity. Radio Frequency (RF) simulation tools along with the physical topology of the local network 200 can be used to predict the placement of the sensors 202a, 202b to guarantee coverage and to minimize signal bleed into neighboring areas.

The sensors 202a, 202b are configured to monitor data transmitted on the wireless networks 170a, 170b and to communicate relevant data, events, and statistics to the server 201. The sensors 202a, 202b can be configured to monitor one or more wireless channels such as IEEE 802.11 standard channels and non-standard user-defined channels, Bluetooth, and WiMax channels. The sensors 202a, 202b can monitor more than one channel simultaneously if the sensors 202a, 202b are configured with multiple radios. The sensors 202a, 202b can include a local processor to perform data analysis on wireless events to minimize communications to the server 201.

The server 201 connects to the Ethernet 150 or optionally through the network 160 (not shown) and the server 201 is configured to receive and correlate data, events, and statistics from the sensors 202a, 202b. Further, multiple servers 201 can operate to provide redundancy and load-balancing. Additionally in some examples, access points 180a, 180b and/or local clients 130 can occasionally operate as sensors 202a, 202b to communicate data, events, and statistics to the server 201. Also, local clients 130 equipped with WLAN cards can be configured with software agents, allowing the local clients 130 to periodically monitor the wireless networks 170a, 170b and to communicate data, events, and statistics from monitoring the wireless networks 170a, 170b to the server 201.

The server 201 can be configured to detect attacks and events, network performance degradation, and network policy compliance on the wireless networks 170a, 170b. Further, the server 201 can be configured to direct the sensors 202a, 202b to terminate a rogue wireless client (e.g. an unauthorized user) such as wireless hackers 185a, 185b. Also, the server 201 can include a data store to log history and trends relating to the wireless network 170a, 170b. The combination of the server 201 and sensors 202a, 202b is known as a wireless intrusion prevention system (WIPS). An example of a WIPS system is the AirDefense Enterprise Release 7.0 (available from the assignee, AirDefense, Inc. of Alpharetta, Ga.).

In regards to network policy compliance, an example network policy can include a no-wireless policy. For example, an enterprise can require a wireless-free zone due to security. Such a policy can forbid the use of IEEE 802.11, Bluetooth, and WiMax protocols, or can allow communications over specified channels. As more and more enterprises adopt wireless networks, the enterprises who do not want it will get stricter about it. Auditors will look for compliance to a no wireless policy. The sensors 202a, 202b and the server 201 can be configured to proactively enforce a no wireless policy ensuring and reporting compliance to the policy.

Figure 3:
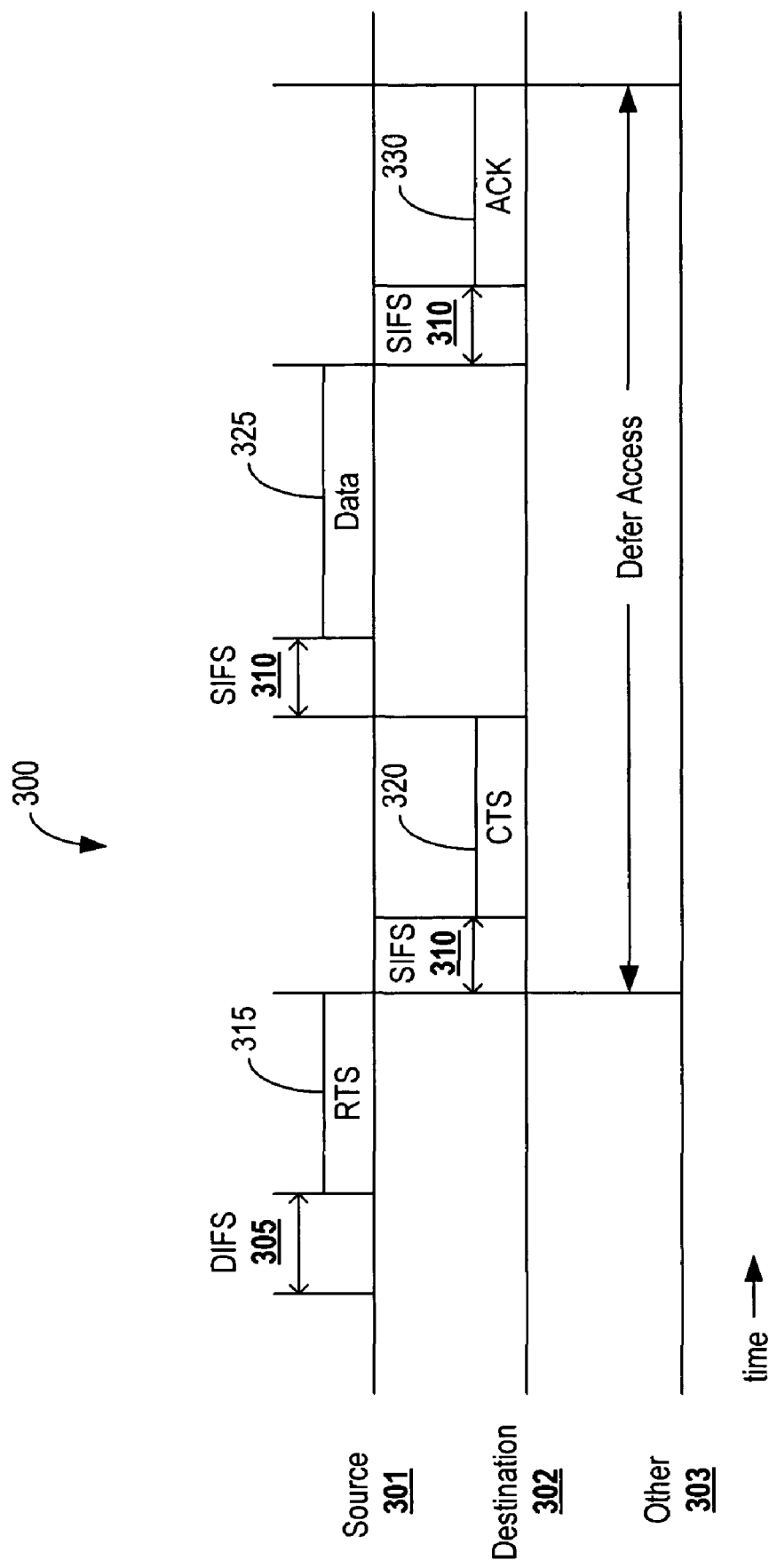
FIG. 3 illustrates collision avoidance and data integrity mechanisms in IEEE 802.11.

FIG. 3 illustrates collision avoidance and data integrity mechanisms 300 in IEEE 802.11. IEEE 802.11 utilizes a physical carrier sense and a virtual carrier sense to avoid collisions. Physical carrier sense utilizes a back-off mechanism when the channel is busy, but suffers from the hidden node problem which leads to difficulty in access control where one node is visible from a wireless hub, but not from other nodes communicating with the hub. To alleviate the hidden node problem, IEEE 802.11 implements virtual carrier sensing using request-to-send (RTS) 315 and clear-to-send (CTS) 320 frames. RTS 315 and CTS 320 is an additional method to implement virtual carrier sensing in carrier sense multiple access with collision avoidance (CSMA/CA).

A node wishing to send data initiates the process by sending a RTS 315 frame. The destination node replies with a CTS 320 frame. Any other node receiving the CTS 320 frame should refrain from sending data for a given time (solving the hidden node problem). The amount of time the node should wait before trying to get access to the channel is included in both the RTS 315 and the CTS 320 frame. Any other node receiving the RTS 315 frame but not the CTS 320 frame is permitted to transmit to other neighboring nodes (solving the exposed node problem).

A source node 301 listens to the wireless channel. If it is clear for a distributed interframe space (DIFS) 305, then the source node 301 sends a RTS 315 frame stating how long it will take to send a data 325 frame and get an acknowledgment (ACK) 330 frame back from a destination 302 node. Other 303 nodes receive the RTS 315 and back off the wireless channel for the requested time. The other 303 nodes each maintain a network allocation vector (NAV) which is an indicator of time periods when transmission onto the wireless channel will not be initiated by the node whether or not the station's clear channel assessment (CCA) function senses that the wireless channel is busy. The destination 302 node sends a CTS 320 after a short interframe space (SIFS) 310. The source 301 node then sends the data frame 325 after another SIFS 310, and the destination 302 node sends an ACK 330 after another SIFS. Following that, the wireless channel is now free for use again. The other 303 nodes defer access to the wireless channel while the source 301 and destination 302 nodes are communicating based on the requested time.

The RTS 315 and CTS 320 frames contain a Duration/ID field that defines the period of time that the channel is to be reserved to transmit the actual data frame and the returning ACK 330 frame. All nodes within the reception range of either the originating node (which transmits the RTS 315) or the destination node (which transmits the CTS 320) shall learn of the channel reservation. Thus a node can be unable to receive from the originating node, yet still know about the impending use of the medium to transmit a data frame.

Another means of distributing the channel reservation information is the Duration/ID field in directed frames. This field gives the time that the medium is reserved, either to the end of the immediately following ACK 330, or in the case of a fragment sequence, to the end of the ACK 330 following the next fragment.

The RTS/CTS exchange also performs both a type of fast collision inference and a transmission path check. If the return CTS is not detected by the STA originating the RTS, the originating STA may repeat the process (after observing the other channel-use rules) more quickly than if the long data frame had been transmitted and a return ACK frame had not been detected.

Figure 4A:
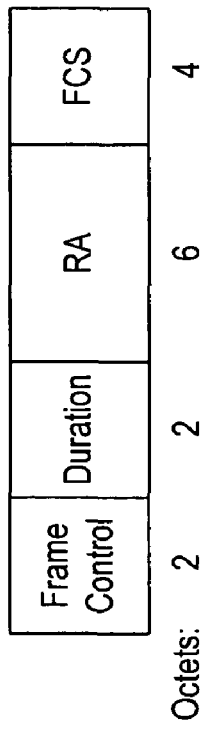
FIGS. 4A-4B illustrate an exemplary embodiment of the present disclosure utilizing CTS frames with long duration fields to reserve a wireless channel thereby preventing other devices from communicating.
Figure 4B:
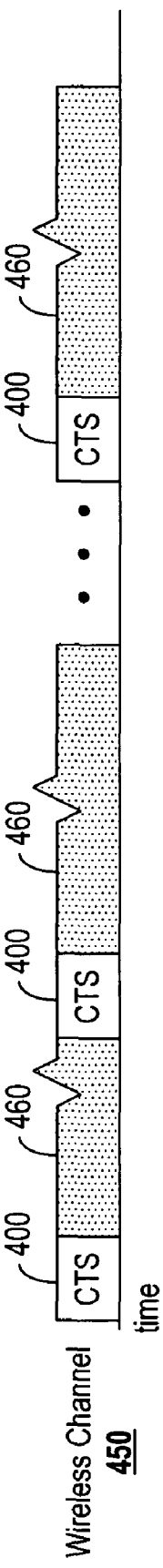

FIGS. 4A-4B illustrate an exemplary embodiment of the present disclosure utilizing CTS 400 frames with long duration fields to reserve a wireless channel thereby preventing other devices from communicating. FIG. 4A illustrates the bytes of the CTS 400 frame. FIG. 4B illustrates a wireless channel 450 with successive CTS 400 frames used to block the channel 450 for a reserved period 460. The CTS 400 frame includes two octets for frame control, two octets for duration, six octets for receiver address (RA), and four octets for frame check sequence (FCS). The RA of the CTS 400 frame is copied from the TA field of the immediately previous RTS frame to which the CTS 400 is a response. The duration value is the value obtained from the Duration field of the immediately previous RTS frame, minus the time, in microseconds, required to transmit the CTS 400 frame and its SIFS interval. If the calculated duration includes a fractional microsecond, that value is rounded up to the next higher integer.

The CTS 400 frame can be transmitted without receiving a RTS frame. For example, the CTS 400 frame can be modified to include a fixed or variable duration field instead of copying the value from the immediately previous RTS frame. Further, the RA of the CTS 400 frame can be any value including the address of the sender (i.e., a self-CTS frame). A sensor or other wireless node can send out successive CTS 400 frames on the wireless channel 450 to effectively block any other devices from communicating on the channel by filling the NAV with the successive CTS 400 frames. The CTS 400 frame blocks the wireless channel 450 for the reserved period 460 which can be up to 32 ms in steps of microseconds.

The successive CTS 400 frames could be transmitted by a wireless sensor, wireless AP, or other wireless node equipped with a wireless radio. Further, the duration field can be randomized (i.e., differing values for successive CTS 400 frames) to differ the reserved period 460. The RA of the CTS 400 frame can also be changed in successive CTS 400 frames. These mechanisms protect against smart clients from determining the CTS 400 frames are being used to block the wireless channel 450.

Figure 5B:
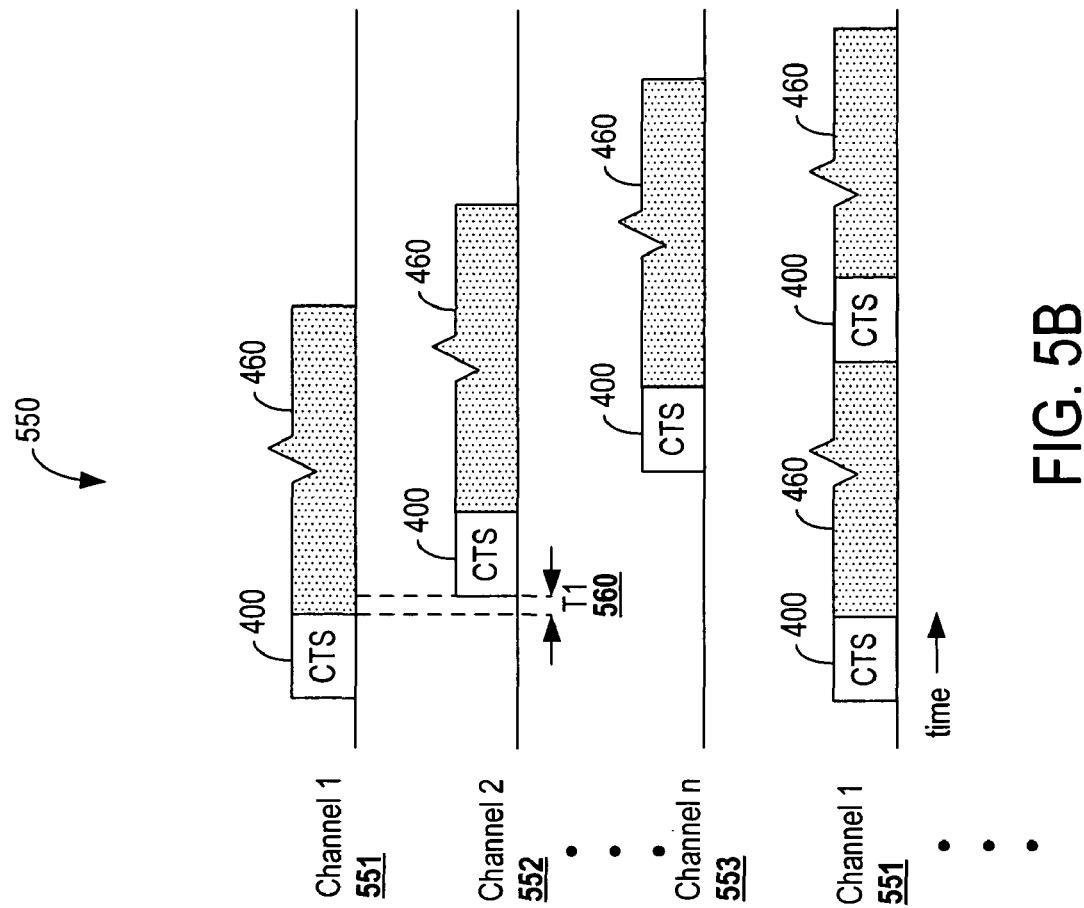
FIGS. 5A-5B illustrate an exemplary embodiment of the present disclosure utilizing CTS frames with long duration fields to reserve the wireless medium over multiple wireless channels thereby preventing other devices from communicating on the wireless channels.
Figure 5A:
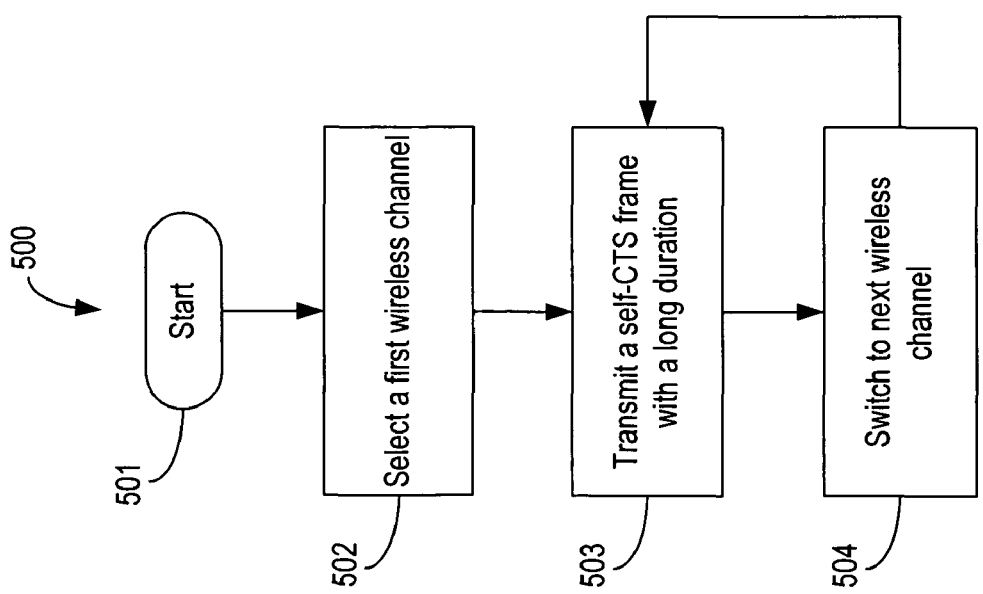

FIGS. 5A-5B illustrate an exemplary embodiment of the present disclosure utilizing CTS 400 frames with long duration fields to reserve the wireless medium over multiple wireless channels thereby preventing other devices from communicating on the wireless channels. FIG. 5A illustrates an operational scenario 500 for utilizing CTS frames over multiple wireless channels to prevent other devices from communication on the wireless channels. FIG. 5B illustrates several wireless channels 550 with successive CTS 400 frames utilized to block IEEE 802.11 communications.

The operational scenario 500 starts, as depicted in step 501. The scenario 500 can be initiated automatically based on policy (e.g., set at a certain time or day) or manually based on a user request. A first wireless channel is selected, as depicted in step 502. For example in the Federal Communications Commission (FCC) domain in the United States, IEEE 802.11b/g utilize 11 channels in the 2.4 GHz ISM (industrial, scientific, medical) band of the spectrum and IEEE 802.11a utilizes up to 23 channels in the 5 GHz band of the spectrum. Operational scenario 500 can be set to any of the 34 channels or to any other non-standard proprietary channel in the 2.4 GHz or 5 GHz bands, and can begin at any channel in particular. The first channel can be selected manually or automatically based on policy.

A self-CTS frame with a long duration is transmitted, as depicted in step 503. A self-CTS frame is transmitted with the RA field set to the address of the sender. Additionally, a CTS frame can be sent with any address in the RA field. The duration of the CTS frame can be set up to the maximum value of 32 ms. Also, the duration value and RA field can be adjusted in successive frames to ensure smart clients cannot detect the CTS is used for RF blocking purposes.

Following the self-CTS frame transmission, operational scenario 500 switches to the next wireless channel, as depicted in step 504. For example, operation scenario 500 can be implemented with a wireless sensor or a wireless AP equipped with a wireless radio configured to transmit over any of the IEEE 802.11 channels in the 2.4 GHz and 5 GHz bands including both the standard IEEE 802.11 channels and non-standard user-defined channels. The wireless radio can be tuned to any channel in the 2.4 GHz and 5 GHz band.

Operational scenario 500 utilizes the ability of the wireless radio to switch channels to cover all frequencies. Additionally, the wireless sensor or AP can include multiple radios that can transmit simultaneously over different channels. In this embodiment, scenario 500 can be modified to cycle through all of the channels with the multiple radios. In addition to adjusting the duration value and RA field, scenario 500 can vary the power level of successive CTS frames to further confuse smart clients from detecting the RF blocking.

A set of channels can be excluded from operational scenario 500. For example, an enterprise may utilize wireless channel 6 in the 2.4 GHz band only, and wish to block usage of channels 1-5, 7-14 in the 2.4 GHz band, and all channels in the 5 GHz band. As such, operational scenario 500 will go through all the channels except channel 6 in the 2.4 GHz band.

Further, operational scenario 500 can utilize an intelligent scanning pattern. The intelligent scanning pattern can randomly select the next channel that is switched to in step 504. Additionally, the pattern can show up more often on channels that are most active based on history. For example in most IEEE 802.11 systems, channels 1, 6, and 11 are the most active. Also, a log can be maintained based upon past events to see which channels are the most active. The intelligent scanning pattern can be used as opposed to sequentially scanning through the channels. This mechanism in addition to focusing on the most active channels also assists in deterring smart clients who sense the RF blocking.

In FIG. 5B, scenario 500 is illustrated with multiple wireless channels 550. Initially, a CTS 400 frame is transmitted over channel 1 551. Note, scenario 500 can begin on any channel, and channel 1 551 is shown for illustrative purposes. Next, the wireless sensor or AP switches to the next channel, channel 2 552. The switch between channels takes T1 560 time as the wireless RF electronics performs the tuning to the next channel. Again, the switch to channel 2 552 is shown for illustrative purposes and the switch can be to any channel or based on an intelligent scanning pattern. Next, the CTS 400 frame is transmitted over channel 2 552. This process repeats across n channels 553 until cycling back to channel 1 551 for the next CTS 400 frame. As described herein, the cycle through n channels can be either sequential or based on an intelligent scanning pattern.

Based on calculations, a self-CTS packet is 14 bytes long, and even at the long preamble 1 Mb/s rate, this is just 304 µs long. A typical wireless sensor or AP takes approximately 50 µs to change channels. Therefore, a self-CTS frame can be transmitted in less than 0.5 ms on a given channel. The duration field of the self-CTS frame is 16 bits, i.e. it can block a channel for up to 32 ms. This implies that 64 self-CTS frames can be transmitted before having to transmit one again on the first channel. This is sufficient to cover all 34 channels in the 2.4 GHz and 5 GHz bands. Further, multiple radios further reduce the time intervals allowing multiple self-CTS frames to be transmitted on multiple channels simultaneously.

Figure 6A:
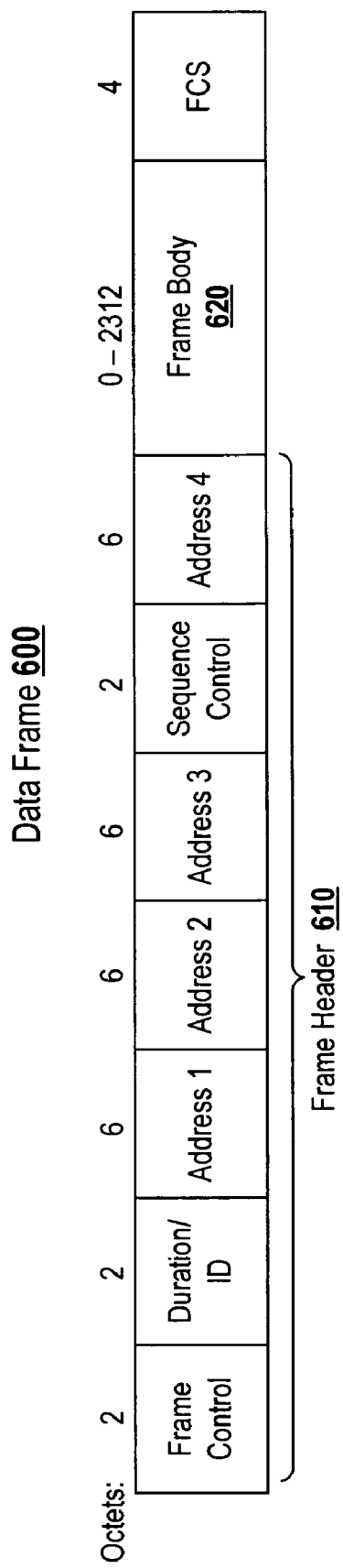
FIGS. 6A-6B illustrate an exemplary embodiment of the present disclosure utilizing Data frames with long duration fields to cause other devices that may want to communicate to continuously set their NAV and prevent them from getting a clear channel assessment (CCA).
Figure 6B:
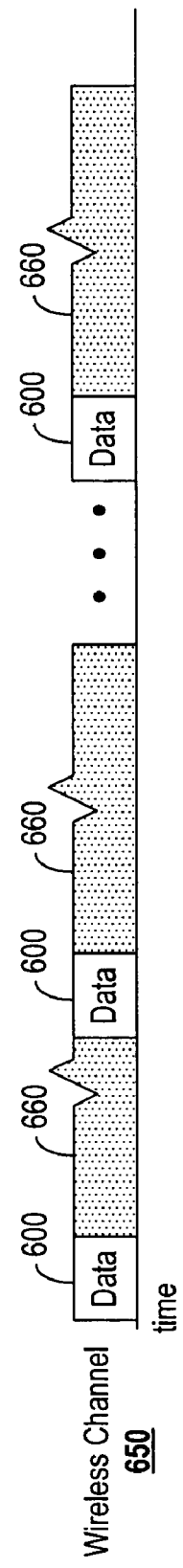

FIGS. 6A-6B illustrate an exemplary embodiment of the present disclosure utilizing Data 600 frames with long duration fields to cause other devices that may want to communicate to continuously set their NAV and prevent them from getting a clear channel assessment (CCA). FIG. 6A illustrates the bytes of the Data 600 frame including a frame header 610 and a frame body 620. FIG. 6B illustrates a wireless channel 600 with successive Data 600 frames used to block a wireless channel 650 for a reserved period 660. The Data 600 frame includes the frame header 610 which has a duration/ID field similar to the CTS frame. The duration/ID field is used to update network allocation vector (NAV) and also used to identify the station that transmitted the frame in certain control frames. Similarly to the CTS frame, the duration/ID field in the Data 600 frame can be used to prevent other devices from transmitting for up to 32 ms. Also, the Data 600 frame includes the frame body 620 which is variable length and includes the specific data transmitted by the Data 600 frame.

The Data 600 frame can be transmitted successively on the wireless channel 650 as illustrated in FIG. 6B. The Data 600 frames each can include long duration fields to force other devices to continuously reset their NAV preventing them from communicating on the wireless channel 650. A sensor or other wireless node can send out successive Data 600 frames on the wireless channel 650 to effectively block any other devices from communicating on the channel by filling the NAV with the successive Data 600 frames. The Data 600 frame blocks the wireless channel 650 for the reserved period 660 which can be up to 32 ms in steps of microseconds.

The successive Data 600 frames could be transmitted by a wireless sensor, wireless AP, or other wireless node equipped with a wireless radio. The duration field can be randomized (i.e., differing values for successive Data 600 frames) to protect against smart clients from determining the Data 600 frames are blocking the wireless channel 650. Also, the addresses and power levels of successive Data 600 frames can be adjusted to disguise the RF blocking.

The frame body 620 of the data frame 600 can include random data to simulate real data traffic to ensure smart clients do not detect an attempt to block RF communications. In the case of multiple sensors in a monitored area, the Data 600 frame can be configured to carry data with cryptographic payloads and special signatures that only allow other authorized sensors to determine these are authorized transmissions from the sensor infrastructure and not attempt to block these transmissions. For example, the frame body 620 of the data frame 600 can include these payloads. These mechanisms could be used by the multiple sensors to communicate to one another or back to a server. Additional mechanisms to allow sensors to communicate wirelessly can include media access control (MAC) address based filtering and RF fingerprinting.

Figure 7B:
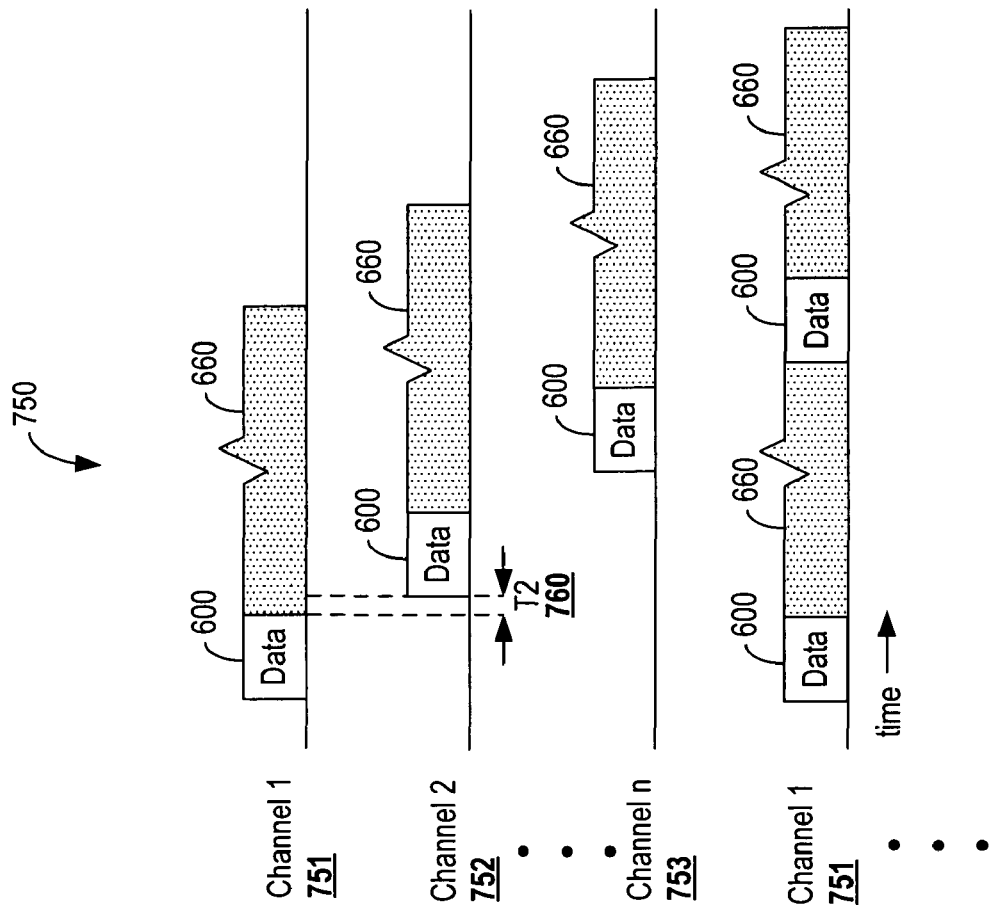
FIGS. 7A-7B illustrate an exemplary embodiment of the present disclosure utilizing Data frames with long duration fields to reserve the wireless medium over multiple wireless channels thereby preventing other devices from communicating on the wireless channels.
Figure 7A:
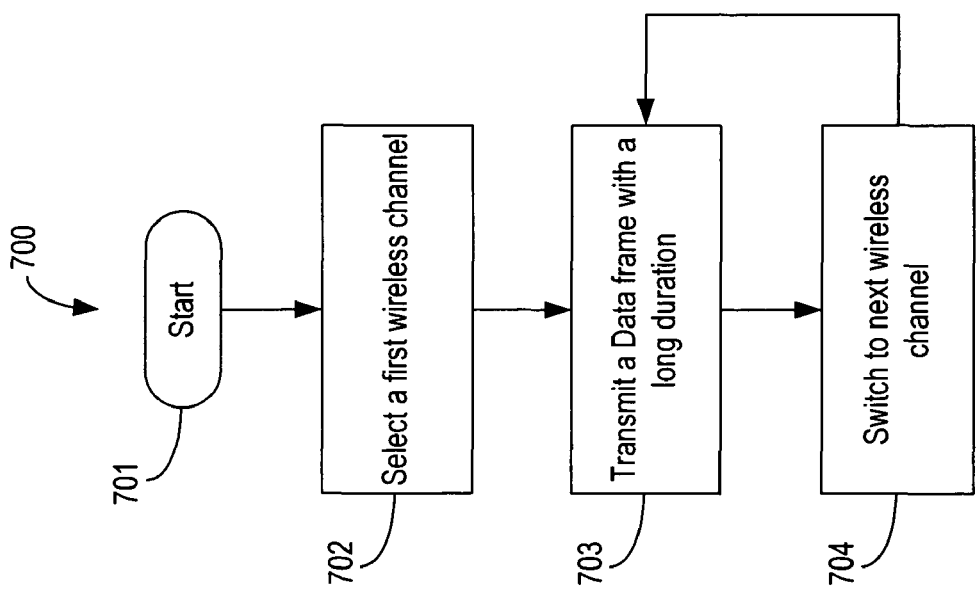

FIGS. 7A-7B illustrate an exemplary embodiment of the present disclosure utilizing Data 600 frames with long duration fields to reserve the wireless medium over multiple wireless channels thereby preventing other devices from communicating on the wireless channels. FIG. 7A illustrates an operational scenario 700 for utilizing Data frames over multiple wireless channels to prevent other devices from communication on the wireless channels. FIG. 7B illustrates several wireless channels 750 with successive Data 600 frames utilized to block IEEE 802.11 communications.

The operational scenario 700 starts, as depicted in step 701. The scenario 700 can be initiated automatically based on policy (e.g., set at a certain time or day) or manually based on a user request. A first wireless channel is selected, as depicted in step 702. As described herein under the FCC domain, IEEE 802.11b/g utilizes 11 channels in the 2.4 GHz ISM band of the spectrum. Additionally, IEEE 802.11a utilizes up to 23 channels in the 5 GHz band of the spectrum. Operational scenario 700 can be set to any of the 34 channels or to any other non-standard proprietary channel in the 2.4 GHz or 5 GHz bands, and can begin at any channel in particular. The first channel can be selected manually or automatically based on policy.

A Data frame with a long duration is transmitted, as depicted in step 703. The Data frame can be transmitted with up to 32 ms duration, and the addresses in the frame header can be set to the sender's address, to other sensors, or to any other address. Further, the frame body can include data simulated to look like legitimate data traffic to ensure no client detects the attempt to block RF communication. Also, the duration value, addresses, and power levels can be adjusted in successive frames to ensure smart clients cannot detect the Data frame is used for RF blocking purposes.

Following the Data frame transmission, operational scenario 700 switches to the next wireless channel, as depicted in step 704. For example, operation scenario 700 can be implemented with a wireless sensor or a wireless AP equipped with a wireless radio configured to transmit over any of the IEEE 802.11 channels in the 2.4 GHz and 5 GHz bands including both the standard IEEE 802.11 channels and non-standard user-defined channels. The wireless radio can be tuned to any channel in the 2.4 GHz and 5 GHz band.

Operational scenario 700 utilizes the ability of the wireless radio to switch channels to cover all frequencies. Additionally, the wireless sensor or AP can include multiple radios that can transmit simultaneously over different channels. In this embodiment, scenario 700 can be modified to cycle through all of the channels with the multiple radios.

Further, a set of channels can be excluded from operational scenario 700. For example, an enterprise may utilize wireless channel 6 in the 2.4 GHz band only, and wish to block usage of channels 1-5, 7-14 in the 2.4 GHz band, and all channels in the 5 GHz band. As such, operational scenario 700 will go through all the channels except channel 6 in the 2.4 GHz band.

Further, operational scenario 700 can utilize an intelligent scanning pattern. The intelligent scanning pattern can randomly select the next channel that is switched to in step 704. Additionally, the pattern can show up more often on channels that are most active based on history. For example in most IEEE 802.11 systems, channels 1, 6, and 11 are the most active. Also, a log can be maintained based upon past events to see which channels are the most active. The intelligent scanning pattern can be used as opposed to sequentially scanning through the channels. This mechanism in addition to focusing on the most active channels also assists in deterring smart clients who sense the RF blocking.

In FIG. 7B, scenario 700 is illustrated with multiple wireless channels 750. Initially, a Data 600 frame is transmitted over channel 1 751. Note, scenario 700 can begin on any channel, and channel 1 751 is shown for illustrative purposes. Next, the wireless sensor or AP switches to the next channel, channel 2 752. The switch between channels takes T2 760 time as the wireless RF electronics performs the tuning to the next channel. Next, the Data 600 frame is transmitted over channel 2 752. This process repeats across n channels 753 until cycling back to channel 1 751 for the next Data 600 frame. As described herein, the cycle through n channels can be either sequential or based on an intelligent scanning pattern.

Based on calculations, a data frame is between 34 bytes to 2346 bytes long. At the long preamble 1 Mb/s rate, this is between 464 µs and 18.96 ms long. A typical wireless sensor or AP takes approximately 50 µs to change channels. Therefore, a data frame can be transmitted in between than 514 µs and 19 ms on a given channel. The duration field of the data frame is 16 bits, i.e. it can block a channel for up to 32 ms. Assuming the frame body of the data frame is short (e.g. a couple of bytes), a data frame could be transmitted on a channel every 514 µs. This is sufficient to cover all 34 standard IEEE 802.11 channels and any non-standard user-defined channels in the 2.4 GHz and 5 GHz bands. Further, multiple radios further reduce the time intervals allowing multiple or longer Data frames to be transmitted on multiple channels simultaneously.

Figure 8:
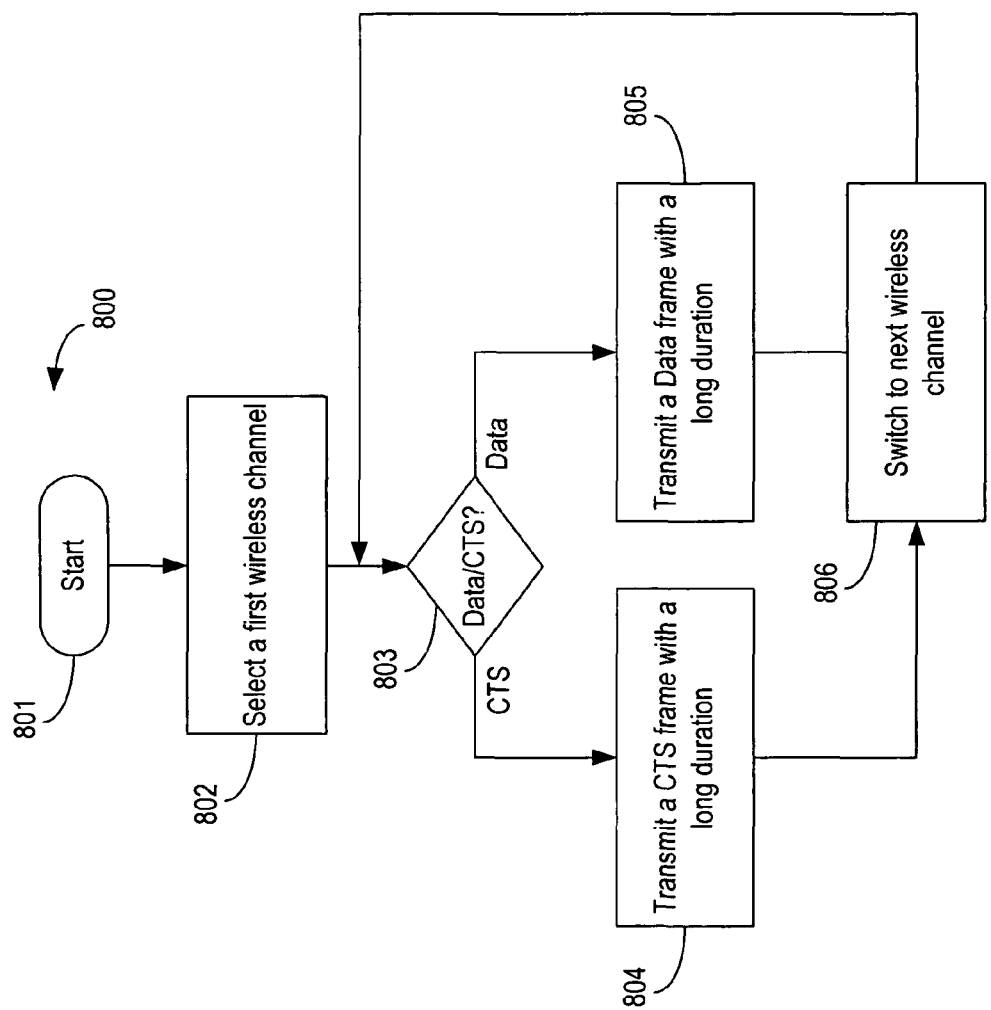
FIG. 8 illustrates an operational scenario which utilizes Data and self-CTS frames with long duration fields to reserve the wireless medium over multiple wireless channels thereby preventing other devices from communicating on the wireless channels.

FIG. 8 illustrates an operational scenario 800 which utilizes Data and self-CTS frames with long duration fields to reserve the wireless medium over multiple wireless channels thereby preventing other devices from communicating on the wireless channels. Scenario 800 combines the CTS and Data mechanisms described herein to block wireless communications across an IEEE 802.11 network. Mixing CTS and Data frames appears to be more legitimate, preventing smart clients from detecting the RF blocking mechanisms.

The operational scenario 800 starts, as depicted in step 801. The scenario 800 can be initiated automatically based on policy (e.g., set at a certain time or day) or manually based on a user request. A first wireless channel is selected, as depicted in step 802. Operational scenario 800 can be set to any of the 34 standard IEEE 802.11 channels or non-standard user-defined IEEE 802.11 channels in the 2.4 GHz and 5 GHz bands, and can begin at any channel in particular. The first channel can be selected manually or automatically based on policy.

Either a Data or CTS frame with a long duration is transmitted, as depicted in step 803. Scenario 800 can be configured to transmit either a Data or CTS frame each time it cycles through a channel. This mixture provides protection against smart clients detecting the RF blocking mechanism. Scenario 800 can utilize pre-determined algorithms to determine whether to transmit Data or CTS frames, or randomly select whether to send Data or CTS frames. The mix of Data and CTS frames is selected to model legitimate traffic to ensure clients do not detect the RF blocking. Additionally, the mix of Data and CTS frames can be selected to ensure all channels are covered since a small Data frame takes over twice as long to transmit as a self-CTS frame. Statistical modeling can be performed to provide a pattern of Data and CTS frames from which step 803 selects a Data or CTS frame.

If a CTS frame is selected in step 803, then a CTS frame is transmitted with a long duration, as depicted in step 804. A self-CTS frame can be transmitted with the RA field set to the address of the sender. Additionally, a CTS frame can be sent with any address in the RA field and this address can be modified in successive CTS frame transmission. The duration of the CTS frame can be set up to the maximum value of 32 ms. Also, the duration value and power level of the transmission can be adjusted in successive frames to ensure smart clients cannot detect the CTS is used for RF blocking purposes.

If a Data frame is selected in step 803, then a Data frame is transmitted with a long duration, as depicted in step 805. The Data frame can be transmitted with up to 32 ms duration, and the addresses in the frame header can be set to the sender's address, to other sensors, or to any other address. Further, the frame body can include data simulated to look like legitimate data traffic to ensure no client detects the attempt to block RF communication. The length of the frame body must be selected to ensure coverage of all wireless channels since a long Data frame can take up to 19 ms to transmit. Also, the duration value, payload, addresses, and power level of the transmission can be adjusted in successive frames to ensure smart clients cannot detect the Data frame is used for RF blocking purposes.

Following the Data or CTS frame transmission, operational scenario 800 switches to the next wireless channel, as depicted in step 806. For example, operation scenario 800 can be implemented with a wireless sensor or a wireless AP equipped with a wireless radio configured to transmit over any of the standard and non-standard IEEE 802.11 channels in the 2.4 GHz and 5 GHz bands. The wireless radio can be tuned to any channel in the 2.4 GHz and 5 GHz band. Operational scenario 700 utilizes the ability of the wireless radio to switch channels to cover all frequencies. Additionally, the wireless sensor or AP can include multiple radios that can transmit simultaneously over different channels. In this embodiment, scenario 800 can be modified to cycle through all of the channels with the multiple radios. Multiple radios allow Data frames to be transmitted with longer frame bodies.

Operational scenario 800 can utilize an intelligent scanning pattern with regards to step 803 and 806. The intelligent scanning pattern can randomly select the next channel that is switched to in step 806 and select a frame type in step 803. Additionally, the pattern can show up more often on channels that are most active based on history. For example in most IEEE 802.11 systems, channels 1, 6, and 11 are the most active. Also, a log can be maintained based upon past events to see which channels are the most active. The intelligent scanning pattern can be used as opposed to sequentially scanning through the channels. This mechanism in addition to focusing on the most active channels also assists in deterring smart clients who sense the RF blocking.

Further, a set of channels can be excluded from operational scenario 800. For example, an enterprise may utilize wireless channel 6 in the 2.4 GHz band only, and wish to block usage of channels 1-5, 7-14 in the 2.4 GHz band, and all channels in the 5 GHz band. As such, operational scenario 800 will go through all the channels except channel 6 in the 2.4 GHz band.

With regards to IEEE 802.11 channels, channels are defined in 5 MHz steps in the 2.4 GHz and 5 GHz ISM bands. Since the 5 GHz band is approximately 1 GHz wide, there can be up to 200 channels. Channel numbering is flexible with different equipment utilizing WiFi extensions and proprietary channels. The operational scenarios 500,700,800 discussed herein are configured to operate on any channel in the ISM bands.

Figure 9B:
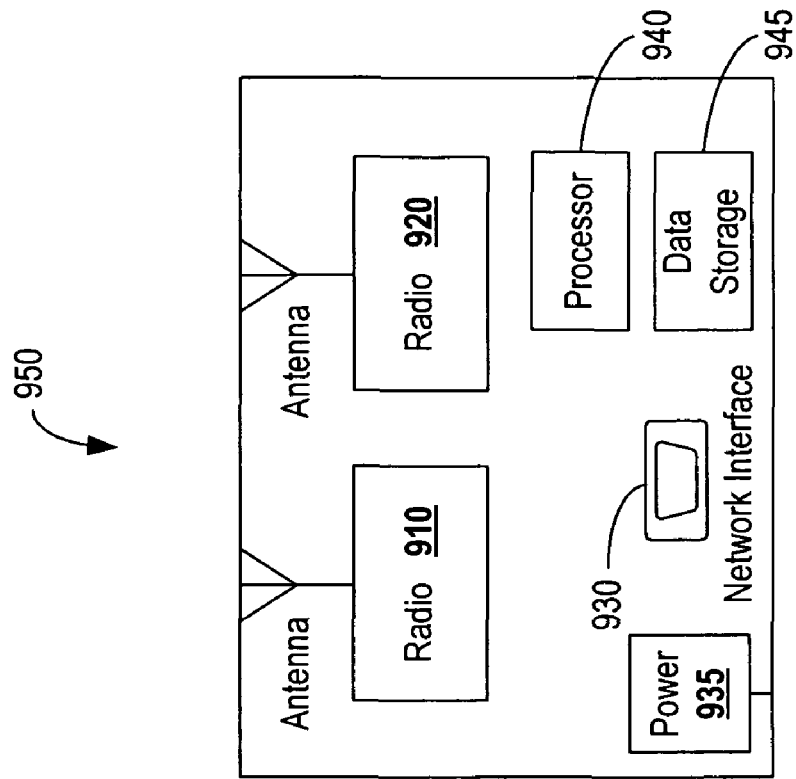
FIGS. 9A-9B illustrate an exemplary embodiment of wireless sensors for monitoring multiple channels on a wireless network for wireless activity; for transmitting frames on the wireless network; and for communicating data, events, and statistics to a server.
Figure 9A:
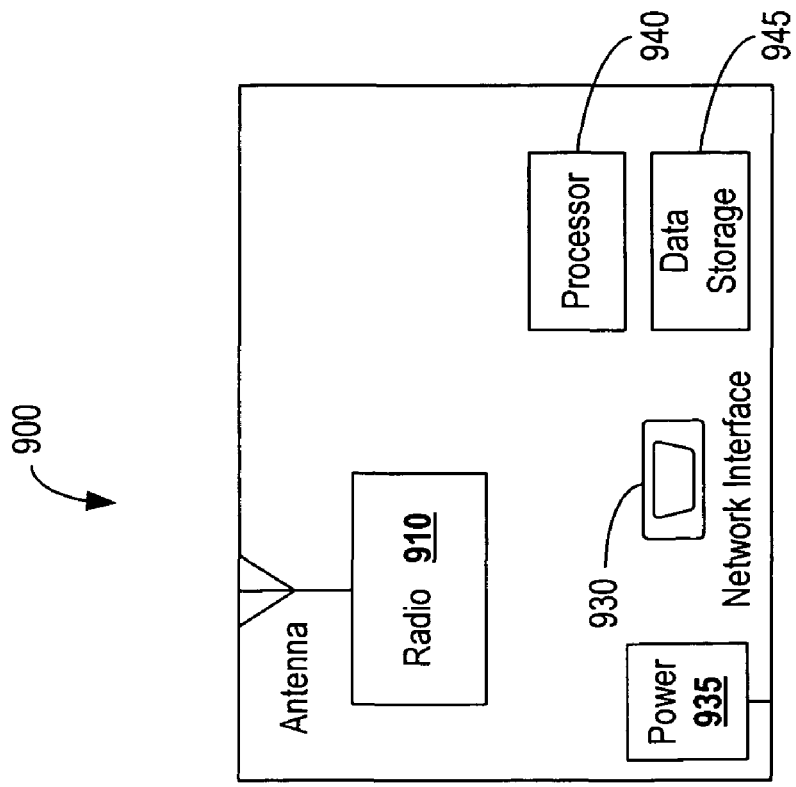

FIGS. 9A-9B illustrate an exemplary embodiment of wireless sensors 900, 950 for monitoring multiple channels on a wireless network for wireless activity; for transmitting frames on the wireless network; and for communicating data, events, and statistics to a server. FIG. 9A illustrates a wireless sensor 900 configured with a single radio 910, and FIG. 9B illustrates a wireless sensor 950 configured with dual radios 910, 920. Additionally, wireless sensors can include more than two radios to provide the ability to monitor and transmit over more than two channels simultaneously.

The antennas on the radios 910, 920 are configured to receive and transmit wireless signals according to a predetermined protocol such as a variant of IEEE 802.11. The radios 910, 920 can be configured as transceivers or as sensing devices. When configured as transceivers, the radios 910, 920 operate to transmit and receive wireless traffic similar to a wireless AP, and other wireless devices can connect to the radios 910, 920 and communicate through a network interface 930. When configured as a sensing device, the radios 910, 920 monitor the wireless network only. In an exemplary embodiment, the wireless radio 950 includes one transceiver radio and one sensing radio to allow monitoring of the wireless network with the sensing radio and active transmission with the transceiver radio. The radios 910, 920 can be operated as transceivers in "promiscuous mode" in order to be undetectable from the airwaves and still read all IEEE 802.11 network traffic. The sensor software embedded on the device would read IEEE 802.11 frames from the wireless network and interrogate them to strip the management and control frames from the data frames, collect the data and send it to a server. The sensor 900, 950 can further include a local processor 940 that serves as the system processor. Optionally, the local processor 940 can be configured to perform data processing on collected data prior to sending it to the server to minimize network communications by performing distributed data analysis.

The network interface 930 is configured to connect to an external network such as a local Ethernet or a direct connection such as an RS232. The network interface 930 is utilized to communicate to external devices such as the server. The sensor 900, 950 can further include local data storage 945 that serves as a system data store (SDS). This local storage 945 contains any necessary operating code and/or data such as accumulated security data, network configuration data, sensor identification information and/or network communication related data. The local storage 945 typically includes DRAM, FLASH memory or combinations thereof.

The local processor 940 supports communication management, security collection, and security analysis functionality. The local processor 940 can be any microprocessor, ASIC, FPGA or combination thereof that has the computing power capable of managing the radios 910, 920 and the auxiliary components of the device (e.g., local storage 940, network interface 920, etc.); for example, a Pentium I Class microprocessor (Intel) or faster is capable of managing the computing needs. The sensors 900, 950 will also include a connection to a power source 935 such as an alternating current (AC) interface, direct current (DC) interface, power over Ethernet (PoE) compatible interface, or a repository for one or more disposable and/or rechargeable batteries.

As previously described in FIG. 2, the sensors 202a, 202b and/or access points 180a, 180b and local clients 130 in some embodiments collect and forward security related data, events, and statistics to the server 201 for further processing and analysis. In some particular embodiments using an IEEE 802.11 network, the sensors read IEEE 802.11 frames and strip management and control frames, aggregate statistics and send collected data to a server. A wireless sensor can have several embodiments including the sensors 900, 950 depicted in FIGS. 9A-9B. Further, a wireless sensor could include a modified IEEE 802.11 access point configured to strip management and control frames and to communicate the data back to a server for analysis.

Additionally, access points and wireless clients can provide a similar functionality to wireless sensors. Access points can be configured to monitor the wireless network while idle and to report data, statistics, and events back to the server. Wireless clients with WLAN cards can be configured with a software agent that utilizes the idle time on the client to monitor the wireless network and to report data, statistics, and events back to the server.

A wireless sensor will typically include at least one IEEE 802.11 radio capable of reading IEEE 802.11 frames. To provide functionality for securing a wireless network, the wireless sensor strips IEEE 802.11 management and control frames off of wireless frame transmissions and sends real-time or batched data back to a centralized server (e.g., server 201) for analysis and processing to determine intrusions or other network activity such as health or performance monitoring or performing such analysis and processing locally in peer-to-peer configurations.

Figure 10:
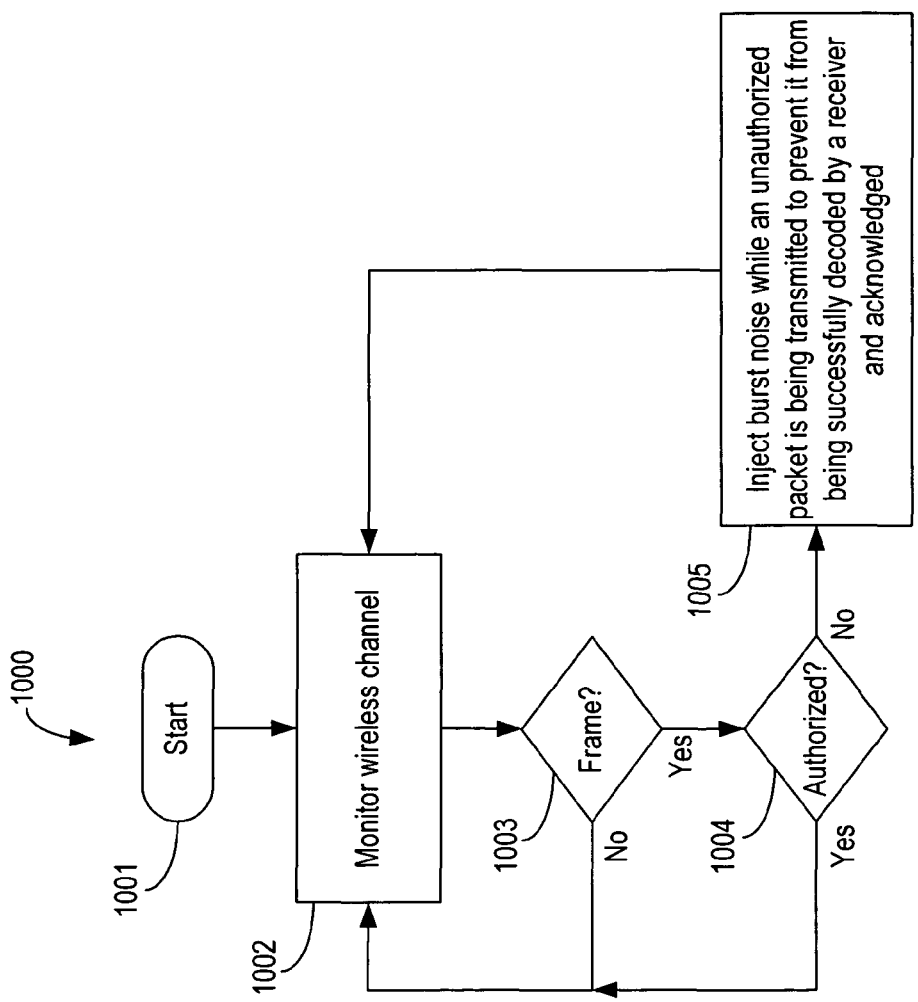
FIG. 10 illustrates an operational scenario which utilizes narrow-band noise while an unauthorized frame is being transmitted over a wireless network to prevent it from being successfully decoded by a receiver and acknowledged.

FIG. 10 illustrates an operational scenario 1000 which utilizes narrow-band noise while an unauthorized frame is being transmitted over a wireless network to prevent it from being successfully decoded by a receiver and acknowledged. Scenario 1000 represents an OSI layer 2 approach to blocking RF communications. Here, a wireless device is connected at layer 1 to an IEEE 802.11 network, but unable to communicate due to the noise injection.

The operational scenario 1000 starts, as depicted in step 1001. The scenario 1000 can be initiated automatically based on policy (e.g., set at a certain time or day) or manually based on a user request. A wireless channel is monitored, as depicted in step 1002. Scenario 1000 is performed on a single IEEE 802.11 channel at a time, and it continuously monitors the wireless channel for any frames, as depicted in step 1003. If no frames are detected, then the wireless channel is still monitored as depicted in step 1002. If a frame is detected in step 1003, then scenario 1000 checks to see if the frame is authorized, as depicted in step 1004. An authorized frame can include a frame with a MAC address from an authorized device such as a sensor, AP, or authorized client, or it can include frames transmitted according to policy such as at a certain time. If the frame is authorized, then the wireless channel is still monitored as depicted in step 1002.

If the frame is unauthorized (e.g. unauthorized device, no-wireless policy), then burst noise is injected while the unauthorized packet is being transmitted to prevent it from being successfully decoded by a receiver and acknowledged, as depicted in step 1005, and the wireless channel is continued to be monitored as depicted in step 1002. A sensor or other wireless device such as an AP or client can be configured to disrupt any wireless frame on the wireless network. For example, one of the sensors can read the first few initial bits of a wireless frame to determine the source address, destination address, and the frame type. If the sensor or a server communicating with the server determines the frame is an unauthorized frame, then the sensor can transmit noise in the body of the wireless frame. When the frame is received by a wireless client, it is discarded because of the noise and the client does not decode the frame avoiding any potential damage from an unauthorized frame.

Figure 11:
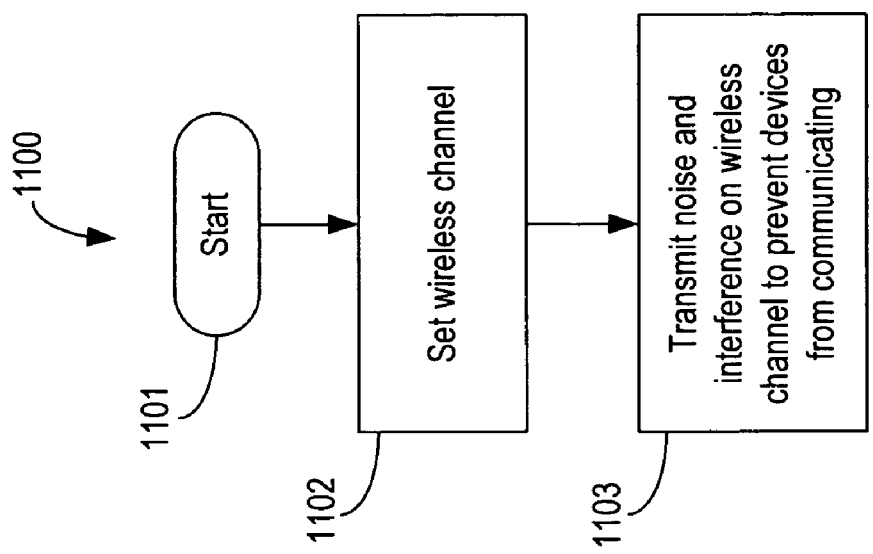
FIG. 11 illustrates operational scenario which utilizes broad-band noise and interference to block a wireless channel preventing devices from communicating.

FIG. 11 illustrates operational scenario 1100 which utilizes broad-band noise and interference to block a wireless channel preventing devices from communicating. Scenario 1100 represents another OSI layer 2 approach to blocking RF communications. Here, a wireless device is connected at layer 1 to an IEEE 802.11 network, but unable to communicate due to the noise and interference on the channel.

The operational scenario 1100 starts, as depicted in step 1101. The scenario 1100 can be initiated automatically based on policy (e.g., set at a certain time or day) or manually based on a user request. A wireless channel is set, as depicted in step 1102. Scenario 1100 is performed on a single IEEE 802.11 channel at a time. Noise and interference is transmitted on the wireless channel to prevent devices from communicating, as depicted in step 1103. Scenario 1100 is meant to block all RF communications on a wireless channel by continuously transmitted noise and interference effectively making the wireless channel unusable.

Figure 12:
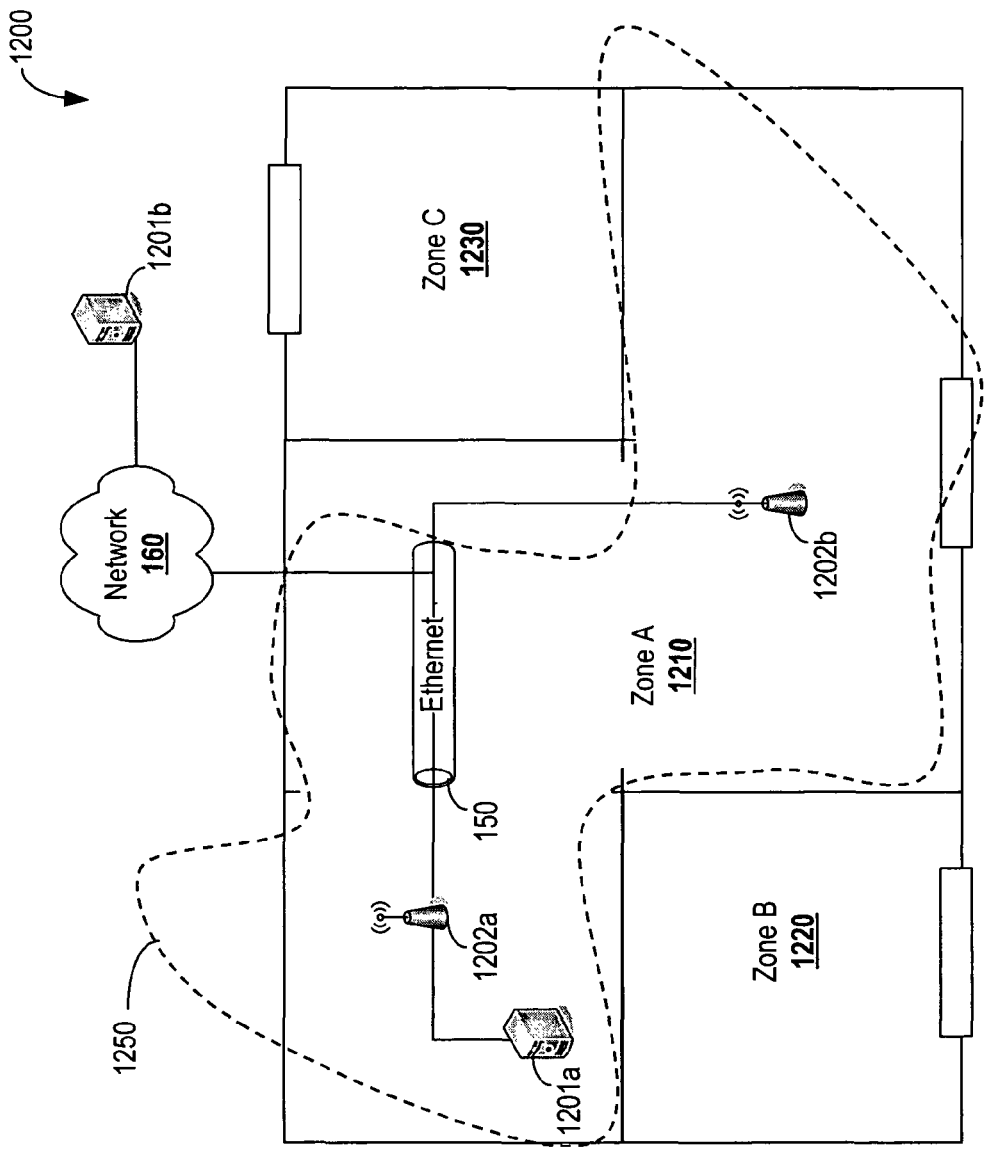
FIG. 12 illustrates an exemplary embodiment of RF coverage planning over a pre-defined area for wireless activity which can be used with the various mechanisms for preventing IEEE 802.11 wireless communications described herein.

FIG. 12 illustrates an exemplary embodiment of RF coverage planning over a pre-defined area 1200 for wireless activity which can be used with the various mechanisms for preventing IEEE 802.11 wireless communications described herein. The pre-defined area 1200 can include an office building, apartment/condominium building, medical office, commercial outlet, or any other building or area deploying a wireless network or seeking to prevent wireless communications on one or more channels. The pre-defined area 1200 includes three zones: zone A 1210, zone B 1220, and zone C 1230.

In the example illustrated in FIG. 12, wireless sensors 1202*a*, 1202*b* are deployed throughout Zone A and the sensors 1202*a*, 1202*b* are connected to a local server 1201*a* through an Ethernet 150 connection and a remote server 1201*b* through an external network 160 such as the Internet. The wireless sensors 1202*a*, 1202*b* can be configured to perform operational scenarios 500, 700, 800, 1000, and 1100 described herein to block IEEE 802.11 wireless communications. The servers 1201*a*, 1201*b* connect to the sensors 1202*a*, 1202*b* and are configured to receive events, alarms, notifications, data, and statistics from the sensors 1202*a*, 1202*b*. In an exemplary embodiment, the sensors 1202*a*, 1202*b* and servers 1201*a*, 1201*b* are a wireless intrusion prevention system (WIPS) with the additional functionality of enforcing a no wireless policy. In another embodiment, the sensors 1202*a*, 1202*b* and servers 1201*a*, 1201*b* are a stand-alone system configured to enforce a no wireless policy.

Zone A 1220 is deployed as a wireless-free zone and Zones B and C 1220, 1230, which neighbor Zone A 1220, are not affected by the wireless free zone through the use of smart antennas and RF coverage planning. Sensors 1202*a*, 1202*b* are configured to only block wireless communications in coverage area 1250 to not affect Zones B 1220 and C 1230.

In one embodiment, RF simulation tools along with the physical topology of the covered area are used to predict placement of sensors 1202*a*, 1202*b* to guarantee coverage and minimize signal bleed into neighboring areas that could have wireless communications enabled. RF simulation and planning can be used to optimize sensor 1202*a*, 1202*b* placement for maximum average coverage area per sensor; maximum frequency coverage in a given area; maximum time coverage in a given area; and user defined time, frequency, and spatial coverage.

In another embodiment, smart antennas on the sensors 1202*a*, 1202*b* adjust power levels to prevent signal bleed from the sensors 1202*a*, 1202*b* into Zone B 1220 and Zone C 1230. Here, the sensors 1202*a*, 1202*b* measure signal strengths of other sensors transmissions and report this to the servers 1201*a*, 1201*b* which in turn determine if any power levels need to be adjusted. Further, these smart antenna mechanisms can be used along with RF simulation tools to refine sensor 1202*a*, 1202*b* placement predictions and to continuously monitor the physical topology to ensure proper coverage.

An example RF simulation tool is AirDefense Architect (available from the assignee, AirDefense, Inc. of Alpharetta, Ga.). AirDefense Architect provides complete design and simulation of wireless local area network (WLANs) based on building-specific environments. AirDefense Architect provides accurate and predictive designs of Wi-Fi networks (IEEE 802.11) before the actual deployment of access points, sensors and other wireless devices. With AirDefense Architect, designers can accurately design WLANs by converting drawing files or floor plans into multi-story building databases and specifying RF characteristics of walls and other obstructions from an RF attenuation database. AirDefense Architect enhances WLAN design by simulating the expected performance of the network and graphically displaying these results in a site-specific 2D or 3D model. Vital information such as RSSI (Received Signal Strength Indicator), SIR (Signal to Interference Ratio), SNR (Signal to Noise Ratio), predicted throughput and bit-error rate can be viewed.

Additionally, RF simulation tools can include site survey measurements of the wireless network to provide optimization in the RF simulation. An example site survey program is AirDefense Survey (available from the assignee, AirDefense, Inc. of Alpharetta, Ga.) which can be coupled with AirDefense Architect. AirDefense Survey provides real-time, in-field measurements for site surveys and seamlessly integrates measurements into AirDefense Architect for optimization and comparison of RF predictions.

Figure 13:
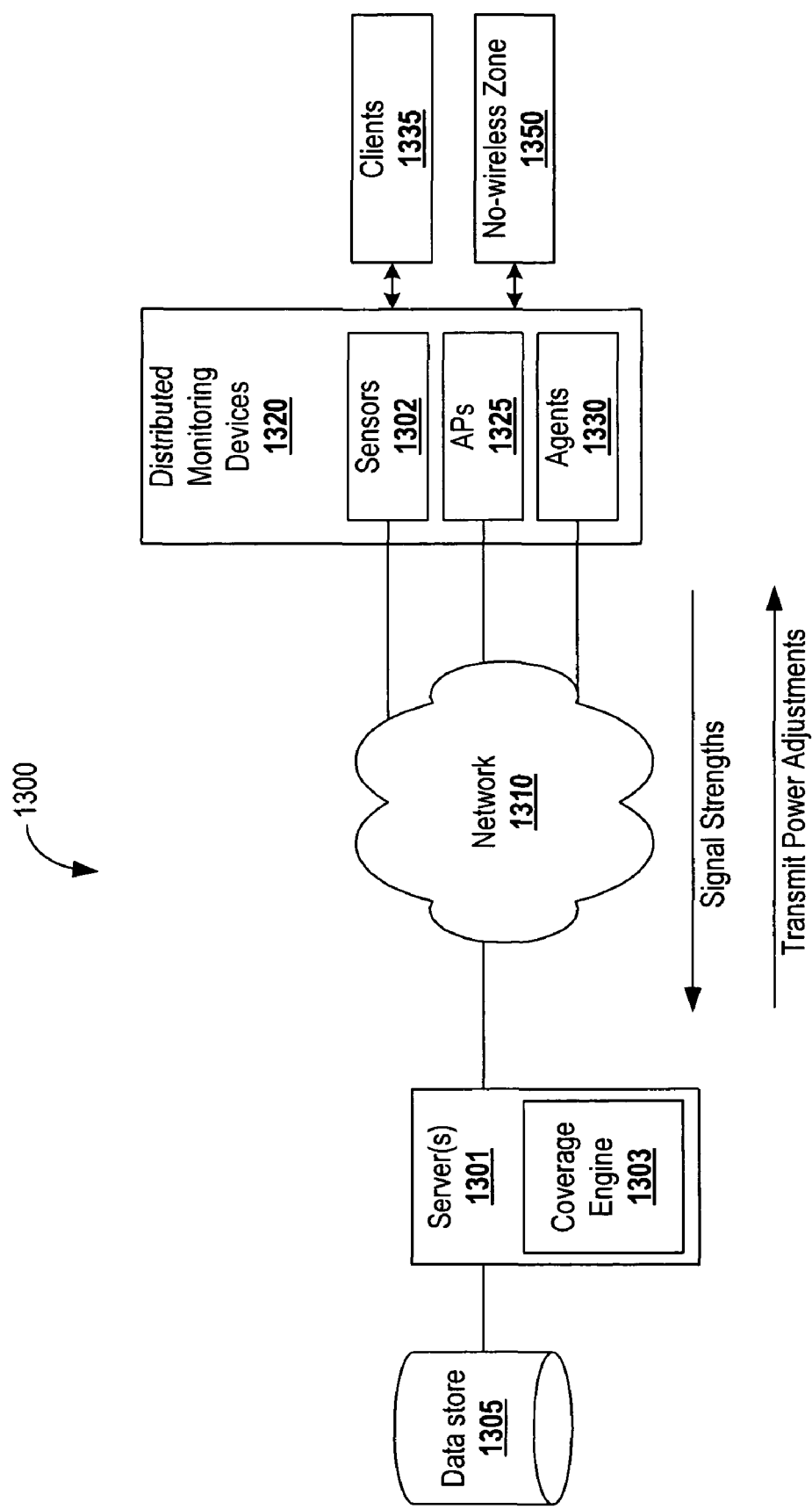
FIG. 13 illustrates an exemplary embodiment of a system of the present disclosure for proactively enforcing a wireless free zone over an enterprise's airspace coupled with smart antennas and coverage planning to avoid disrupting a neighbor's wireless communications.

FIG. 13 illustrates an exemplary embodiment of a system 1300 of the present disclosure for proactively enforcing a wireless free zone over an enterprise's airspace coupled with smart antennas and coverage planning to avoid disrupting a neighbor's wireless communications. The system 1300 include a server 1301 configured with a coverage engine 1303 and connected to multiple distributed monitoring devices 1320 through a network 1310. The network 1310 can include the Internet, a LAN, a WAN, among others.

The distributed monitoring devices 1320 include sensors 1302, APs 1325, and software agents 1330. The devices 1320 are configured to monitor and proactively enforce a no-wireless zone, and to communicate with the server 1301 to coordinate coverage and no-wireless policies. The devices 1320 are physically located throughout an enterprise's airspace to monitor clients 1335 which can include both authorized and unauthorized devices and to enforce a no-wireless zone 1350 according to policy. The sensors 1302 are dedicated radios configured to passively monitor and to transmit RF blocking mechanisms described herein to enforce a no-wireless zone. In an example embodiment, the sensors 1302 are part of a WIPS, and in another embodiment, the sensors 1302 are stand-alone devices configured solely to enforce a no-wireless policy.

The APs 1325 can include standard wireless APs configured to provide wireless access. The APs 1325 can be configured to monitor the network while not actively communicating and to communicate to the server 1301. Further, the APs 1335 can be configured according to policy to enforce a no-wireless zone such as, for example, based on a certain day or time. The software agents 1330 are loaded onto clients 1335 and enable the client 1335 to act as a part-time sensor when the client 1335 is not in use. Further, these agents 1330 can be configured to disrupt wireless communications according to policy according to the mechanisms described herein.

The server 1301 is configured to communicate with the devices 1320 to receive monitored data, events, and statistics and to coordinate no-wireless mechanisms. The coverage engine 1303 is configured to provide smart antenna and coverage planning support. The engine 1303 includes RF simulation tools to predict device 1320 locations and a site survey mechanism to receive real-time field measurements to optimize placements and to adjust transmitter power on sensors 1302 and APs 1325 where required. In an exemplary embodiment, the server 1301 receives signal strength measurements from the devices 1320 and utilizes the coverage engine 1303 to determine if any transmitter powers need to be adjusted to ensure there is no signal bleed from the no-wireless zone 1350 into neighbor's airspace. Additionally, the server 1301 connects to a data store 1305 to maintain historical data.

The server 1301 and the devices 1320 can incorporate site survey data from the perimeter to determine signal level bleeds by placing sensors in special diagnostic mode when they are continuously transmitting. Also, the server 1301 and the devices 1320 can use location tracking to use the source of a transmitting device to determine if it is in or out of bounds of the no-wireless zone 1350. An example of location tracking is described in U.S. Pat. No. 7,058,796, ""METHOD AND SYSTEM FOR ACTIVELY DEFENDING A WIRELESS LAN AGAINST ATTACKS", which is hereby incorporated by reference.

Another mechanism the system 1300 can utilize to terminate wireless sessions between clients 1335 and APs 1325 in the no-wireless zone 1350 are disassociation/deauthentication frames. This mechanism operates to terminate sessions by sending these frames by the sensors 1302 to the clients 1335 pretending to be one of the APs 1325, and to the APs 1325 pretending to be the clients 1335 thereby mutually terminating the connection.

The system 1300 can be integrated into existing wireless intrusion prevention systems (WIPS) or it can be a stand-alone system solely for enforcing a no-wireless policy. The system 1300 can implement any of the operational scenarios 500, 700, 800, 1000, 1100 described herein. Additionally, the system 1300 can implement OSI layer 3 mechanisms for higher layer blocking of Internet protocol (IP)-based communications using the devices 1320 to inject spoofed address resolution protocol (ARP) frames and transmission control protocol (TCP) denial-of-service (DoS) using synchronize/reset (SYN/RST) frames.

ARP spoofing, also known as ARP poisoning, is a technique used to attack an Ethernet network which may allow an attacker to sniff data frames on a switched local area network (LAN) or stop the traffic altogether (i.e., DoS attack). The principle of ARP spoofing is to send fake, or 'spoofed', ARP messages to an Ethernet LAN. These frames contain false MAC addresses, confusing network devices, such as wireless clients 1335. As a result frames intended for one machine can be mistakenly sent to another (allowing the packets to be sniffed) or an unreachable host (a DoS attack). The system 1300 can implement ARP spoofing to prevent any wireless client 1335 from communicating effectively blocking wireless communications.

A SYN flood is a form of DoS attack in which an attacker sends a succession of SYN requests to a target's system. When a client attempts to start a TCP connection to a server, the client and server exchange a series of messages which normally runs like this: the client requests a connection by sending a SYN (synchronize) message to the server; the server acknowledges this request by sending SYN-ACK back to the client, which, responds with an ACK, and the connection is established. This is called the TCP three-way handshake, and is the foundation for every connection established using TCP/IP protocols. The system 1300 can implement a SYN/RST flood to prevent any wireless client 1335 from communicating effectively blocking wireless communications.

Figure 14:
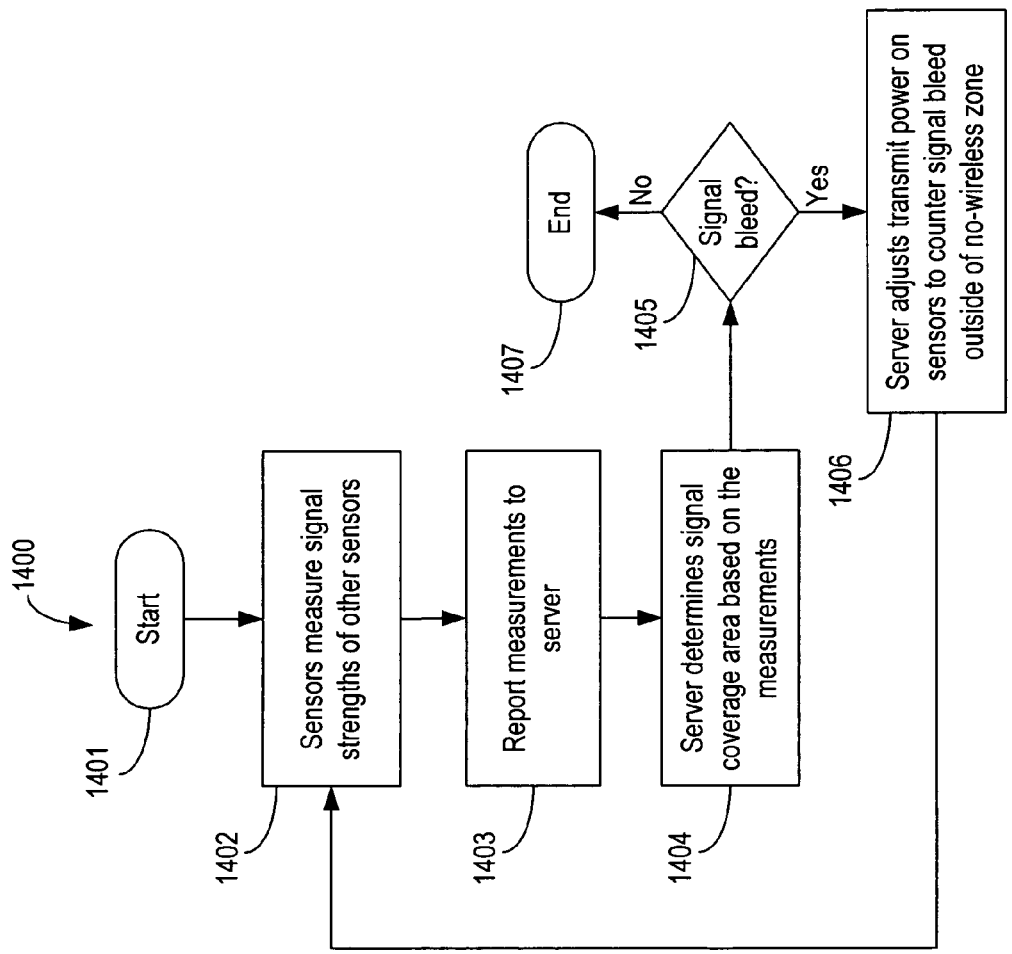
FIG. 14 illustrates an operational scenario of the present disclosure for proactively enforcing a wireless free zone over an enterprise's airspace coupled with smart antennas and coverage planning to avoid disrupting a neighbor's wireless communications.

FIG. 14 illustrates an operational scenario 1400 of the present disclosure for proactively enforcing a wireless free zone over an enterprise's airspace coupled with smart antennas and coverage planning to avoid disrupting a neighbor's wireless communications. The operational scenario 1400 starts, as depicted in step 1401. The scenario 1400 can be initiated automatically based on policy (e.g., set at a certain time or day) or manually based on a user request. Sensors measure the signal strengths of other sensors, as depicted in step 1402. Here, sensors determine the signal strengths of all sensors in range. Additionally, other devices such as APs and clients equipped with software agents can be utilized along with sensors for these measurements.

The signal strength measurements are reported back to a server, as depicted in step 1403. The sensors are connected to the server through a network connection such as Ethernet. The server determines the signal coverage area based on the signal strength measurements, as depicted in step 1404. Here, the server processes the signal strength measurements to define the coverage area. Further, the server can utilize RF planning and simulation tools and incorporate these real-time measurements to optimize performance.

The server determines if there is signal bleed into neighboring areas or into areas which are not part of the no-wireless zone, as depicted in step 1405. The server is configured to monitor the coverage of the sensors and other devices, and to determine if the coverage exceeds a predetermined no-wireless zone. These mechanisms allow enforcement of a no-wireless policy without impacting neighbors. If there is no signal bleed, then the scenario 1400 ends, as depicted in step 1407.

If there is signal bleed, then the server adjusts the transmit power on sensors to counter signal bleed outside of the no-wireless zone, as depicted in step 1406. The server is configured to communicate power adjustments to sensors based on the signal coverage area determination in step 1404. The power adjustments can be a fixed incremental power increase or decrease or a specific power value based on RF planning. After the power adjustments in step 1406, the scenario 1400 is repeated from step 1402 to determine if the adjustments are proper.

Figure 15B:
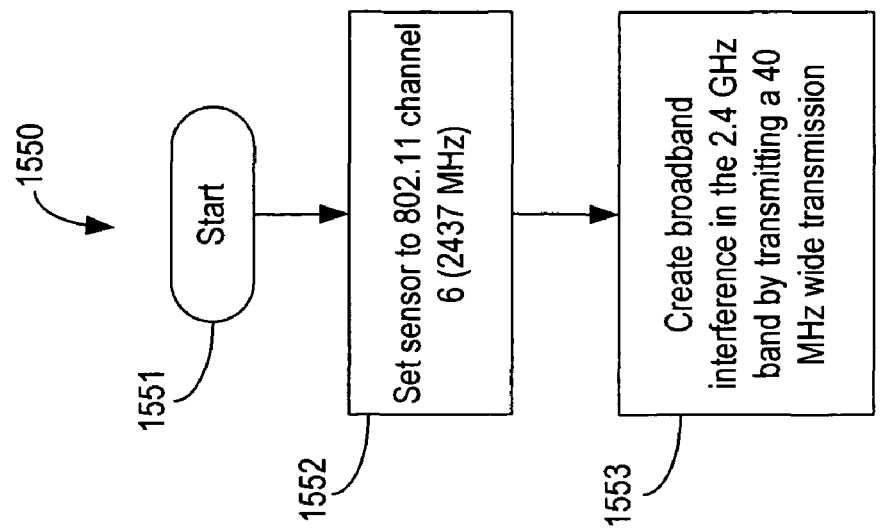
FIGS. 15A-15B illustrate operational scenarios for using DoS mechanisms to prevent Bluetooth devices from wireless communications.
Figure 15A:
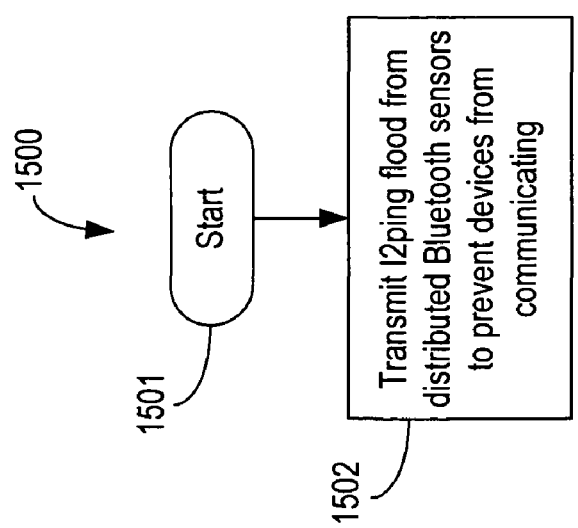

FIGS. 15A-15B illustrate operational scenarios 1500, 1550 for using DoS mechanisms to prevent Bluetooth devices from wireless communications. Bluetooth is an industrial specification for wireless personal area networks (PANs), also known as IEEE 802.15.1. Bluetooth provides a way to connect and exchange information between devices such as personal digital assistants (PDAs), mobile phones, laptops, PCs, printers, digital cameras and video game consoles via a secure, globally unlicensed short-range radio frequency. Enterprises wishing to enforce a no-wireless policy over IEEE 802.11 networks may also seek to prevent Bluetooth communications.

In FIG. 15A, operational scenario 1500 starts, as depicted in step 1501. The scenario 1500 can be initiated automatically based on policy (e.g., set at a certain time or day) or manually based on a user request. A 12ping flood is transmitted from distributed sensors to prevent devices from communicating, as depicted in step 1502. The 12ping allows the user to specify a packet length that is sent to the respective peer. It sends a L2CAP echo request to the Bluetooth MAC address. A 12ping flood effectively prevents Bluetooth devices from communicating. Scenario 1500 can be implemented through a WIPS server/sensor or through stand-alone sensors. Further, Scenario 1500 can be combined with the IEEE 802.11 mechanisms disclosed herein.

In FIG. 15B, operational scenario 1550 starts, as depicted in step 1551. The scenario 1550 can be initiated automatically based on policy (e.g., set at a certain time or day) or manually based on a user request. A sensor is set to IEEE 802.11 channel number 6 (2437 MHz), as depicted in step 1552. Here, the sensor can be part of a WIPS or a stand-alone device. Broadband interference is created in the 2.4 GHz band by transmitting a 40 MHz wide transmission such as, for example, a continuous turbo mode transmission, as depicted in step 1553. A 40 MHz wide transmission on channel 6 severely degrades Bluetooth devices effectively preventing communication. For example a 40 MHz turbo mode transmission can be sent utilizing an Atheros chipset (available from Atheros Communications of Santa Clara, Calif.).

Figure 16B:
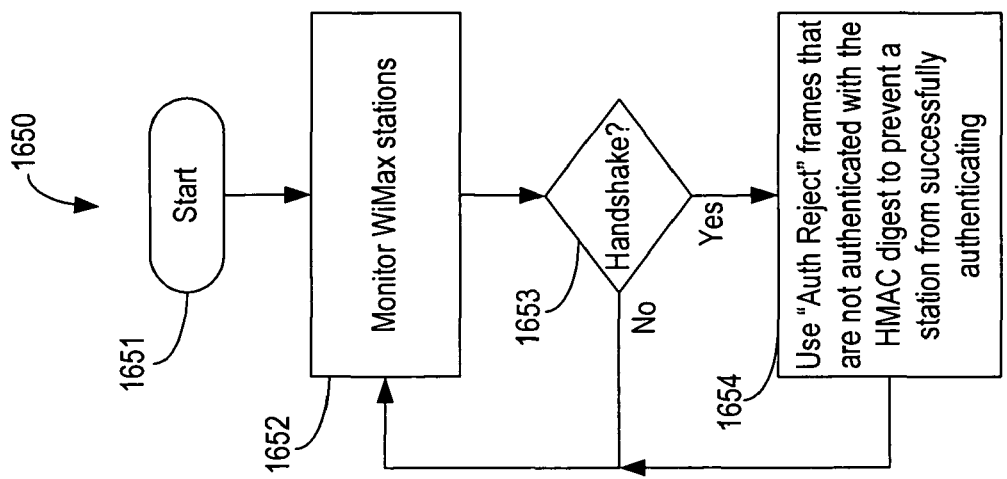
FIGS. 16A-16B illustrate operational scenarios for enforcing no wireless communications over WiMax (IEEE 802.16) networks.
Figure 16A:
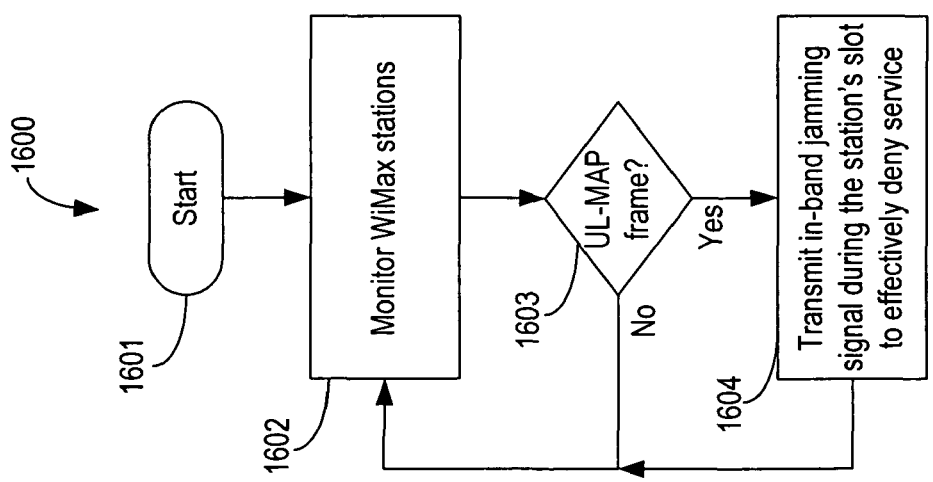

FIGS. 16A-16B illustrate operational scenarios 1600, 1650 for enforcing no wireless communications over WiMax (IEEE 802.16) networks. WiMAX is defined as Worldwide Interoperability for Microwave Access by the WiMAX Forum, formed in June 2001 to promote conformance and interoperability of the IEEE 802.16 standard, officially known as WirelessMAN. The Forum describes WiMAX as "a standards-based technology enabling the delivery of last mile wireless broadband access as an alternative to cable and DSL". Enterprises wishing to enforce a no-wireless policy over IEEE 802.11 networks may also seek to prevent WiMax communications.

In FIG. 16A, operational scenario 1600 starts, as depicted in step 1601. The scenario 1600 can be initiated automatically based on policy (e.g., set at a certain time or day) or manually based on a user request. WiMax stations are monitored, as depicted in step 1602. The monitoring can be done through distributed wireless sensors connected to a server. The server and sensors can be part of a WIPS or a stand-alone system for enforcing WiMax free zones. The monitoring step checks for a UL-MAP frame, as depicted in step 1603. Media access control (MAC) in WiMax is contention free and uses scheduled transmissions. A base station (BS) broadcasts a UL-MAP frame that is available to all stations (i.e., authenticated or not) that determines who transmits when. If no UL-MAP frame is monitored, then scenario 1600 continues to monitor WiMax stations, as depicted in step 1602.

If a UL-MAP frame is detected, then scenario 1600 transmits an in-band jamming signal during one or more stations slot's to effectively deny WiMax service. Scenario 1600 utilizes the UL-MAP frame to determine when subscriber stations (SS) in the no-wireless coverage area are scheduled to transmit. The scenario 1600 utilizes this schedule information to inject valid frames (e.g., replayed frames) to disrupt a stations communication slot. Since the interference is completely "in-band", it is more effective. This jamming is done only when a station in the vicinity is scheduled to transmit according to the UL-MAP frame.

All RF protocols are fundamentally vulnerable to DoS. With a strong enough jammer most wireless communications can be disrupted. While WiMax uses sophisticated forward error correction codes and modulation techniques that are robust to interference, an intelligent jammer can disrupt a specific session without the need to brute force jam the whole medium. The 802.16 MAC is contention free and uses scheduled transmissions. The BS broadcasts a UL-MAP frame that is available to all stations (authenticated or not) that determines who transmits when. An attacker can use the schedule information to inject valid frames (e.g. replayed frames) to disrupt a stations communication slot. Since the interference is completely "in-band" it is much more effective.

In FIG. 16B, operational scenario 1650 starts, as depicted in step 1651. The scenario 1650 can be initiated automatically based on policy (e.g., set at a certain time or day) or manually based on a user request. WiMax stations are monitored, as depicted in step 1652. The monitoring can be done through distributed wireless sensors connected to a server. The server and sensors can be part of a WIPS or a stand-alone system for enforcing WiMax free zones. The monitoring step checks for a handshake, as depicted in step 1653. Handshakes occur in a narrow window during authentication. If no handshake is monitored, then scenario 1650 continues to monitor the WiMax stations, as depicted in step 1652.

If a handshake is monitored, then scenario 1650 uses "Auth Reject" frames that are not authenticated with the HMAC digest to prevent a station from successfully authenticating. The lack of authentication of powerful management frames in 802.11 resulted in popular DoS attacks such as de-authentication/dis-associations attacks. Such attacks disrupt a wireless session between two nodes by injecting spoofed de-authentication/-dis-associations messages by a third party pretending to be one of the communicating nodes. The 802.16 MAC has similar management frames (e.g. Reset and De/Re-register) that can force a subscriber station to disconnect and re-initialize. Unlike 802.11, these frames have cryptographic protections from spoofed identity. Authentication is achieved using a SHA-1 in the form of an HMAC digest computed using the message and a secret key. While the HMAC provides management frame protection, several MAC frames remain vulnerable to simple "replay" attacks. In a re-play attack, a valid frame transmission is captured and replayed. The presence of an HMAC requires that the message be replayed without any modification. Typically, frames use transient information such as serial number or a time-stamp to thwart replay attacks. IEEE 802.16 remains somewhat vulnerable to interference from brute force replay DoS attacks, because there is no mechanism in place to specifically detect and discard repeated packets. An attacker could repeat many messages (whether valid or not) in an attempt to interfere with the proper operation of the network. There are several ways in which the victim network might respond, depending on the exact content and timing of the replayed message.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for proactively preventing wireless transmissions in a zone over a pre-defined area, the method comprising the steps of:
    a) performing radio frequency (RF) simulation of the pre-defined area, wherein the RF simulation is configured to provide placement location of sensors to provide a coverage area in the pre-defined area and to minimize signal bleed into areas neighboring the pre-defined area;
    b) placing sensors in the pre-defined area responsive to the RF simulation; and
    c) providing wireless data transmissions from the sensors to prevent wireless transmissions in the zone throughout the coverage area;
    wherein the providing transmissions step comprises the steps of:
    a) transmitting clear-to-send (CTS) frames with a long duration field to reserve a wireless channel thereby preventing other devices from communicating on the wireless channel; and
    b) repeating step a).

2. The method of claim 1, wherein the providing transmissions step comprises the steps of:
    a) selecting a first wireless channel;
    b) transmitting clear-to-send (CTS) frames with a long duration field to reserve the first wireless channel thereby preventing other devices from communicating on the next wireless channel;
    c) switching to a next wireless channel;
    d) transmitting clear-to-send (CTS) frames with a long duration field to reserve the next wireless channel thereby preventing other devices from communicating on the next wireless channel; and
    e) repeating steps c) through d) over a pre-determined set of wireless channels in the 2.4 GHz and 5 GHz bands, the pre-determined set of wireless channels comprise the channels over which wireless transmissions are prevented in the zone;
    wherein the time of the long duration field exceeds the time required to perform steps c) and d) through the pre-determined set of wireless channels.

3. The method of claim 1, wherein the providing transmissions step comprises the steps of:
    a) transmitting data frames with a long duration field over a wireless channel to cause other devices that may want to communicate to continuously set their network allocation vector to prevent the other devices from getting a clear channel assessment; and
    b) repeating step a).

4. The method of claim 1, wherein the providing transmissions step comprises the steps of:
    a) selecting a first wireless channel;
    b) transmitting data frames with a long duration field over the first wireless channel to cause other devices that may want to communicate to continuously set their network allocation vector to prevent the other devices from getting a clear channel assessment;
    c) switching to a next wireless channel;
    d) transmitting data frames with a long duration field over the next wireless channel to cause other devices that may want to communicate to continuously set their network allocation vector to prevent the other devices from getting a clear channel assessment; and
    e) repeating steps c) through d) over a pre-determined set of wireless channels in the 2.4 GHz and 5 GHz bands, the pre-determined set of wireless channels comprise the channels over which wireless transmissions are prevented in the zone;
    wherein the data frames comprise a frame body with data simulated to look like legitimate data; and
    wherein the time of the long duration field exceeds the time required to perform steps c) and d) through all of the pre-determined set of wireless channels.

5. The method of claim 1, wherein the providing transmissions step comprises the steps of:
    a) selecting a first wireless channel;
    b) selecting a data or clear-to-send frame with a long duration field;
    c) transmitting the selected frame from step b) over the first wireless channel;
    d) switching to a next wireless channel;
    e) selecting a data or clear-to-send frame with a long duration field;
    f) transmitting the selected frame from step e) over the next wireless channel;
    g) repeating steps d) through f) over a pre-determined set of wireless channels, the pre-determined set of wireless channels comprise the channels over which wireless transmissions are prevented in the zone;
    wherein the selecting in steps b) and e) is performed to simulate a mixture of legitimate traffic;
    wherein the data frames comprise a frame body with data simulated to look like legitimate data; and
    wherein the time of the long duration field exceeds the time required to perform steps d) and f) through all of the pre-determined set of wireless channels.

6. The method of claim 5, wherein the mixture of legitimate traffic is created with an intelligent scanning pattern which differs frame sizes, power levels, payloads, duration values, and addresses.

7. The method of claim 5, wherein the switching step switches to the next wireless channel responsive to an intelligent scanning pattern which utilizes prior activity across the pre-determined set of wireless channels to focus on channels which are the most active based on history.

8. The method of claim 5, wherein the sensors comprise multiple radios to enable the enforcing step to operate on multiple channels simultaneously.

9. The method of claim 5, wherein the sensors are operable to communicate with other sensors through data frames with cryptographic payloads and special signatures that allow other sensors to determine these are authorized transmissions from a sensor and not attempt to block these transmissions.

10. The method of claim 1, wherein the enforcing providing transmissions step comprises the steps of:
    a) monitoring a wireless channel;
    b) injecting burst noise while an unauthorized frame is being transmitted to prevent it from being successfully decoded by a receiver and acknowledged; and
    c) repeating steps a) through b).

11. The method of claim 10, wherein the sensors comprise multiple radios to enable the enforcing step to operate on multiple channels simultaneously.

12. The method of claim 1, wherein the providing transmissions step comprises the steps of:
a) selecting a wireless channel;
b) transmitting noise and interference on the wireless channel to prevent devices from communicating; and
c) repeating step b).

13. The method of claim 12, wherein the sensors comprise multiple radios to enable the enforcing step to operate on multiple channels simultaneously.

14. The method of claim 1, wherein the providing transmissions step comprises higher layer blocking of Internet Protocol based communication using the sensors to inject frame spoofed ARP frames or SYN/RST frames for a TCP denial-of-service.

15. The method of claim 1, wherein the providing transmissions step comprises transmitting an 12ping flood from the sensors to prevent Bluetooth devices from communicating.

16. The method of claim 1, wherein the providing transmissions step comprises the steps of:
a) setting the sensors to IEEE 802.11 channel 6 (2437 MHz);
b) transmitting a 40 MHz wide continuous transmission to create broadband interference in the 2.4 GHz band to prevent Bluetooth devices from communicating; and
c) repeating step b).

17. The method of claim 1, wherein the providing transmissions step comprises the steps of:
a) monitoring WiMax stations for UL-MAP frames;
b) transmitting an in-band jamming signal during a station's slot based upon the monitoring of UL-MAP frames to effectively deny the station WiMax service; and
c) repeating steps a) through b).

18. The method of claim 1, wherein the providing transmissions step comprises the steps of:
a) monitoring WiMax stations for a handshake;
b) transmitting Auth Reject frames that are not authenticated with the HMAC digest to prevent a station from successfully authenticating and c) repeating steps a) through b).

19. The method of claim 1, further comprising the steps of:
a) measuring the signal strength of the transmissions of other sensors in the pre-defined area, the measuring performed by the sensors;
b) reporting the measured signal strengths to a server;
c) determining signal coverage over the pre-defined area, the server determines the signal coverage; and
d) adjusting transmit power level on sensors responsive to a determination in determining step c) that the signal coverage exceeds the pre-defined area.

20. The method of claim 19, wherein the server and sensors comprise a wireless intrusion prevention system (WIPS).

21. The method of claim 1, further comprising the step of utilizing signal strength based physical location tracking to determine if the source of a transmission is in or out of bounds of the zone.

22. A system for proactively preventing wireless transmissions in a zone, the system comprising:

one or more sensors connected to a network, the sensors comprise one or more wireless radios configured to monitor a wireless network and to transmit frames on the wireless network; and
a server connected to the one or more sensors through the network, the server configured to log events; generate alarms, notifications, and reports; and direct the one or more sensors to prevent wireless communications in the zone;
wherein the one or more sensors are deployed in an area responsive to radio frequency (RF) simulations which predict the placement of the sensors to guarantee coverage over the area and to minimize signal bleed into neighboring areas, and wherein the one or more sensors are configured to transmit wireless frames in the zone thereby preventing wireless transmissions;
wherein the one or more sensors transmit clear-to-send (CTS) frames with a long duration field to reserve the channel thereby preventing other devices from communicating over a wireless channel in the zone.

23. The system of claim 22, wherein the one or more sensors transmit data frames with long duration fields to cause other devices that may want to communicate on a wireless channel to continuously set their network allocation vector (NAV) and prevent them from getting a clear channel assessment (CCA) to transmit in the zone.

24. The system of claim 22, wherein the one or more sensors transmit a mixture of data and clear-to-send frames with long duration fields while scanning through multiple wireless channels to prevent any other devices from ever communicating on wireless channels in the zone.

25. The system of claim 24, wherein the one or more sensors in the area synchronize through the server and utilized intelligent scanning patterns to maximize temporal and spatial coverage of the multiple wireless channels in the area.

26. The system of claim 22, wherein the one or more sensors are operable to scan and transmit simultaneously over multiple channels using the one or more wireless radios.

27. The system of claim 22, wherein the one or more sensors transmit data frames with cryptographic payloads and special signatures that only allow other authorized sensors to determine these as authorized transmissions from the sensor infrastructure and not attempt to block the authorized transmissions.

28. The system of claim 22, wherein the sensors are further configured to measure the signal strength of the transmissions of other sensors in the area and report the measured signal strengths to the server; and
wherein the server is further configured to determine signal coverage over the area based on the signal strengths and adjust the transmit power level on the one or more sensors responsive to a determination that the signal coverage exceeds the area.

29. The system of claim 22, wherein the server and the one or more sensors comprise a wireless intrusion prevention system (WIPS).

* * * * *